US012652085B2

(12) United States Patent
Park et al.

(10) Patent No.: US 12,652,085 B2
(45) Date of Patent: Jun. 9, 2026

(54) METHOD AND DEVICE FOR TRANSMITTING AND RECEIVING CHANNEL STATE INFORMATION IN WIRELESS COMMUNICATION SYSTEM

(71) Applicant: LG Electronics Inc., Seoul (KR)

(72) Inventors: Haewook Park, Seoul (KR); Jiwon Kang, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 18/728,529

(22) PCT Filed: Jan. 18, 2023

(86) PCT No.: PCT/KR2023/000866

§ 371 (c)(1),
(2) Date: Jul. 12, 2024

(87) PCT Pub. No.: WO2023/140616

PCT Pub. Date: Jul. 27, 2023

(65) Prior Publication Data

US 2025/0080175 A1 Mar. 6, 2025

(30) Foreign Application Priority Data

Jan. 19, 2022 (KR) ........................ 10-2022-0007641

(51) Int. Cl.
*H04B 7/06* (2006.01)
*H04B 7/0456* (2017.01)

(52) U.S. Cl.
CPC ......... *H04B 7/0456* (2013.01); *H04B 7/0626* (2013.01); *H04B 7/0634* (2013.01)

(58) Field of Classification Search
CPC ...... H04B 7/06; H04B 7/0417; H04B 7/0456; H04B 7/0626; H04B 7/0634; H04L 5/00;
(Continued)

(56) References Cited

U.S. PATENT DOCUMENTS

| | | | |
|---|---|---|---|
| 2021/0409991 A1 | 12/2021 | Park et al. | |
| 2022/0302979 A1* | 9/2022 | Hao ........................ | H04B 7/048 |
| 2023/0122302 A1* | 4/2023 | Wang .................... | H04B 7/063 |
| | | | 370/329 |

FOREIGN PATENT DOCUMENTS

| | | |
|---|---|---|
| WO | WO2020238906 A1 | 12/2020 |
| WO | WO2021035396 A1 | 3/2021 |

(Continued)

*Primary Examiner* — Shawkat M Ali
(74) *Attorney, Agent, or Firm* — BRYAN CAVE LEIGHTON PAISNER LLP

(57) ABSTRACT

Disclosed are a method and device by which a terminal transmits CSI in a wireless communication system. A method by which a terminal transmits CSI in a wireless communication system, according to one embodiment of the present disclosure, comprises the steps of: receiving configuration information related to at least one reference signal (CSI-RS) resource from a base station; receiving a CSI-RS from the base station on the basis of the at least one CSI-RS resource; and transmitting the CSI using at least one bitmap related to the position of a non-zero coefficient to the base station on the basis of the CSI-RS, wherein the at least one bitmap may include information about the position of the non-zero coefficient in at least one frequency domain base vector and at least one spatial domain base vector corresponding to a combination of specific time domain base vectors.

9 Claims, 11 Drawing Sheets

(58) Field of Classification Search
CPC ........ H04L 27/26; H04W 4/00; H04W 16/28;
H04W 24/08; H04W 4/10; H04W 72/04
USPC ......................... 375/219, 260, 267, 295, 316
See application file for complete search history.

(56) References Cited

FOREIGN PATENT DOCUMENTS

| WO | WO2021049873 | A1 | 3/2021 |
| WO | WO2021148629 | A1 | 3/2021 |

* cited by examiner

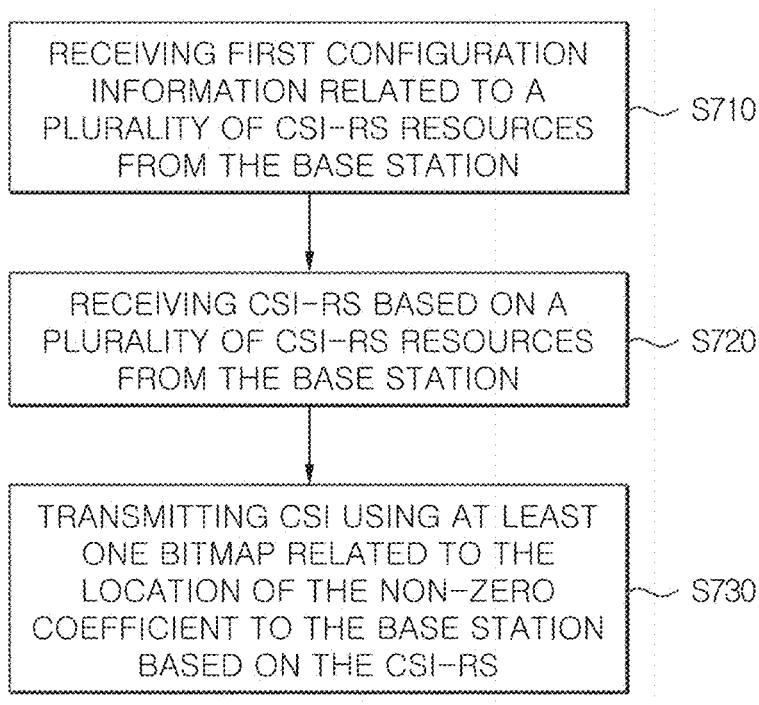

RECEIVING FIRST CONFIGURATION
INFORMATION RELATED TO A
PLURALITY OF CSI-RS RESOURCES
FROM THE BASE STATION            ~ S710

RECEIVING CSI-RS BASED ON A
PLURALITY OF CSI-RS RESOURCES
FROM THE BASE STATION            ~ S720

TRANSMITTING CSI USING AT LEAST
ONE BITMAP RELATED TO THE
LOCATION OF THE NON-ZERO
COEFFICIENT TO THE BASE STATION
BASED ON THE CSI-RS              ~ S730

FIG.8

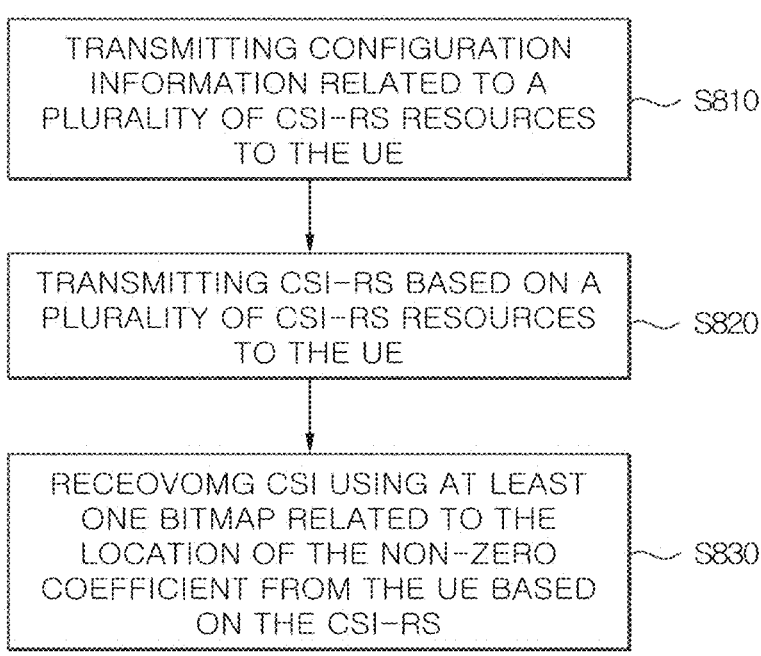

TRANSMITTING CONFIGURATION
INFORMATION RELATED TO A
PLURALITY OF CSI-RS RESOURCES
TO THE UE                        ~ S810

TRANSMITTING CSI-RS BASED ON A
PLURALITY OF CSI-RS RESOURCES
TO THE UE                        ~ S820

RECEOVOMG CSI USING AT LEAST
ONE BITMAP RELATED TO THE
LOCATION OF THE NON-ZERO
COEFFICIENT FROM THE UE BASED
ON THE CSI-RS                    ~ S830

METHOD AND DEVICE FOR TRANSMITTING AND RECEIVING CHANNEL STATE INFORMATION IN WIRELESS COMMUNICATION SYSTEM

CROSS-REFERENCE TO RELATED APPLICATIONS

This application is a National Stage application under 35 U.S.C. § 371 of International Application No. PCT/KR2023/000866, filed on Jan. 18, 2023, which claims the benefit of earlier filing date and right of priority to KR Application No. 10-2022-0007641, filed on Jan. 19, 2022, the contents of which are all hereby incorporated by reference herein in their entirety.

TECHNICAL FIELD

The present disclosure relates to a wireless communication system, and more specifically, to a method and device for transmitting and receiving channel state information (CSI) in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

The technical problem of the present disclosure is to provide a method and device for transmitting and receiving channel state information (CSI) in a wireless communication system.

Additionally, an additional technical problem of the present disclosure is to provide a method and device that uses a bitmap representing a combination of frequency domain basis vectors, space domain basis vectors, and/or time domain basis vectors, when constructing a time domain (or Doppler domain) compression codebook.

The technical objects to be achieved by the present disclosure are not limited to the above-described technical objects, and other technical objects which are not described herein will be clearly understood by those skilled in the pertinent art from the following description.

According to an embodiment of the present disclosure, a method for a user equipment (UE) to transmit channel state information (CSI) in a wireless communication system may include receiving, from a base station, configuration information related to at least one CSI-reference signal (RS)

resource; receiving, from the base station, a CSI-RS based on the at least one CSI-RS resource; and transmitting, to the base station, the CSI using at least one bitmap related to an location of a non-zero coefficient based on the CSI-RS, and the at least one bitmap may include information on the location of the non-zero coefficient in at least one frequency domain basis vector and at least one spatial domain basis vector corresponding to a combination of a specific time domain basis vector.

According to another embodiment of the present disclosure, A method of receiving channel state information (CSI) by a base station in a wireless communication system may include transmitting, to a user equipment (UE), configuration information related to at least one CSI-reference signal (RS) resource; transmitting, to the UE, a CSI-RS based on the at least one CSI-RS resource; and receiving, from the UE, the CSI using at least one bitmap related to an location of a non-zero coefficient based on the CSI-RS, and the at least one bitmap may include information on the location of the non-zero coefficient in at least one frequency domain basis vector and at least one spatial domain basis vector corresponding to a combination of a specific time domain basis vector.

According to an embodiment of the present disclosure, a method and device for transmitting and receiving channel state information (CSI) in a wireless communication system may be provided.

Additionally, according to an embodiment of the present disclosure, when constructing a time domain (or Doppler domain) compression codebook, a method and apparatus may be provided that uses a bitmap representing a combination of a frequency domain basis vector, a space domain basis vector, and/or a time domain basis vector.

In addition, according to an embodiment of the present disclosure, system performance can be improved by effectively performing CSI calculation reflecting the time domain/Doppler domain CSI compression method.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

FIG. 7 is a diagram for describing a CSI transmission operation of a terminal in a wireless communication system to which the present disclosure may be applied.

FIG. 8 is a diagram for describing the CSI reception operation of a base station in a wireless communication system to which the present disclosure may be applied.

Figure 10:
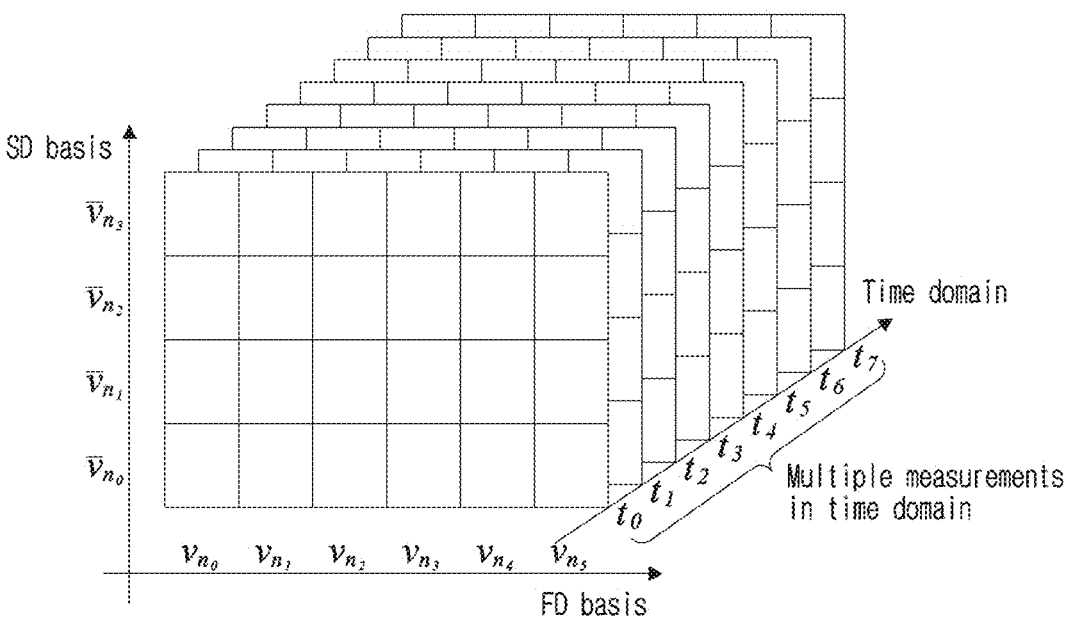

a FIG. 10 illustrates a codebook composed of combination of SD basis vectors and FD basis vectors obtained at a plurality of different viewpoints to which the present disclosure may be applied.

Figure 11:
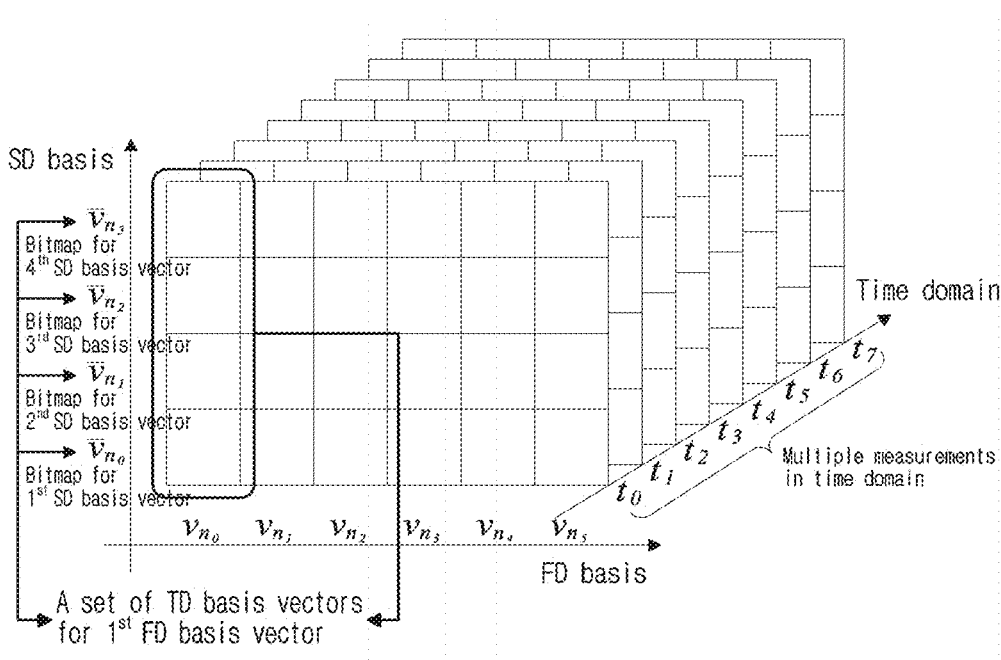

FIG. 11 illustrates a codebook constructed based on a bitmap for each SD basis vector to which the present disclosure may be applied.

Figure 12:
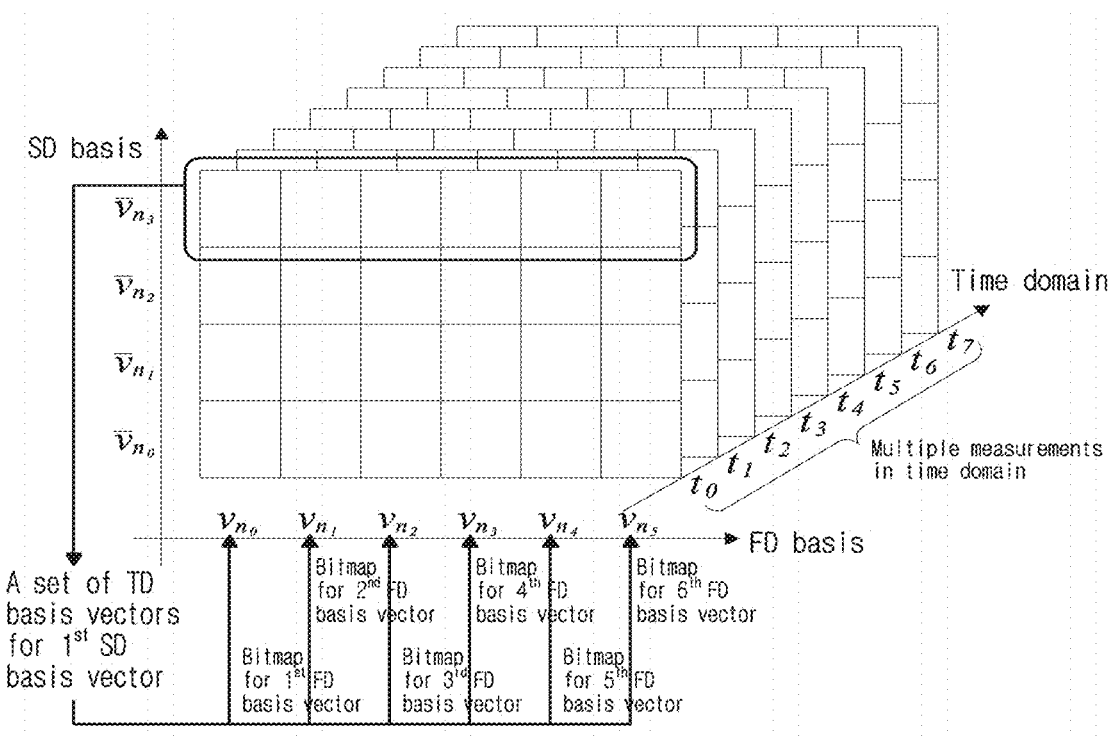

FIG. 12 illustrates a codebook constructed based on a bitmap for each FD basis vector to which the present disclosure may be applied.

Figure 13:
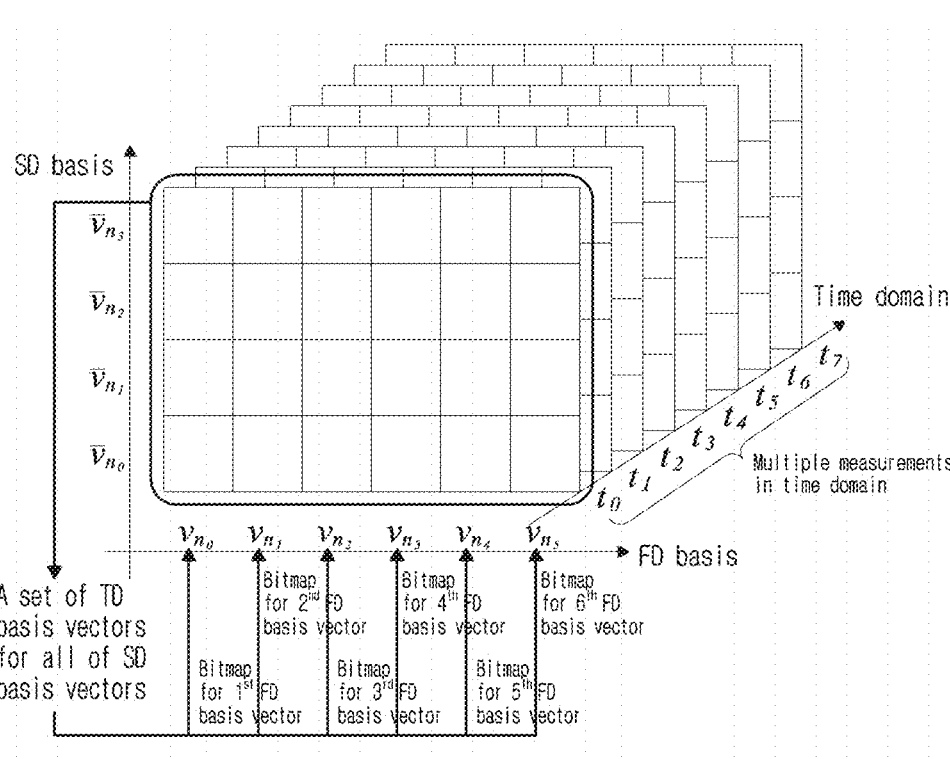

FIG. 13 illustrates a codebook constructed based on a bitmap for each FD basis vector for all SD basis vectors to which the present disclosure may be applied.

Figure 14:
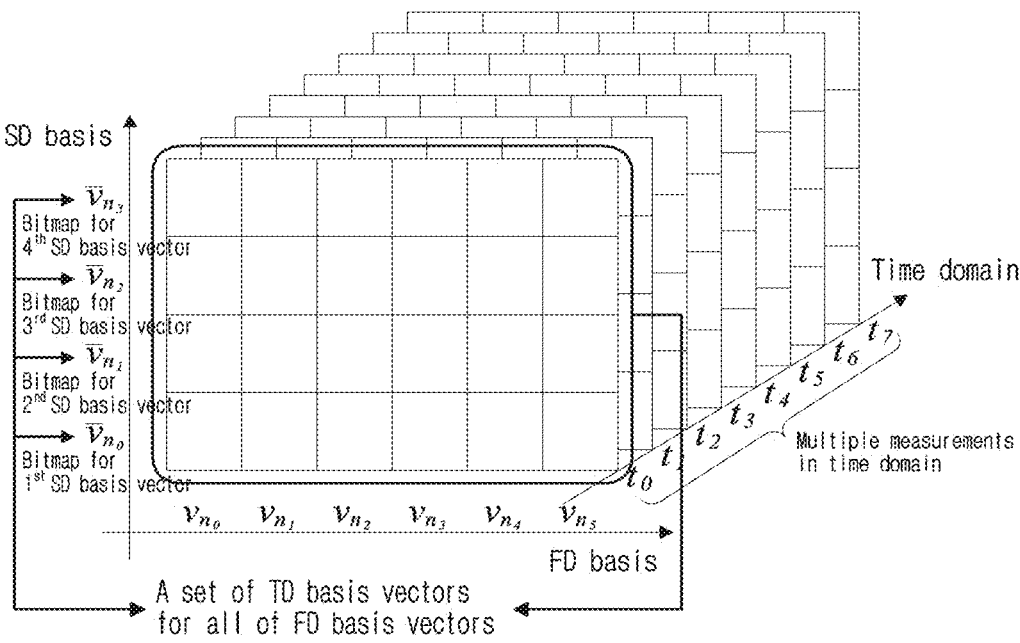

FIG. 14 illustrates a codebook constructed based on a bitmap for each SD basis vector for all FD basis vectors, to which the present disclosure may be applied.

Figure 15:
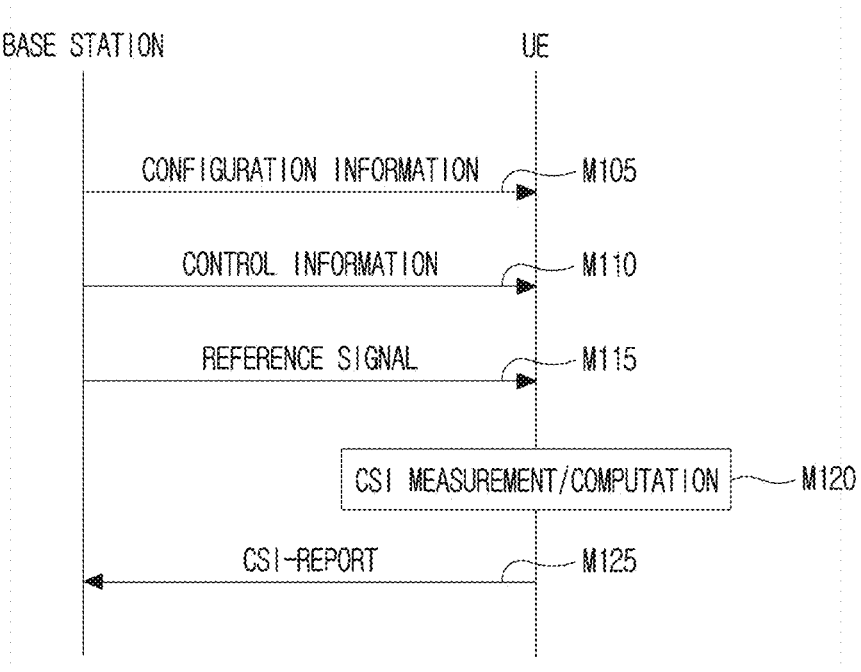

FIG. 15 is a diagram for describing the signaling procedure of the network side and the terminal according to an embodiment of the present disclosure.

Figure 16:
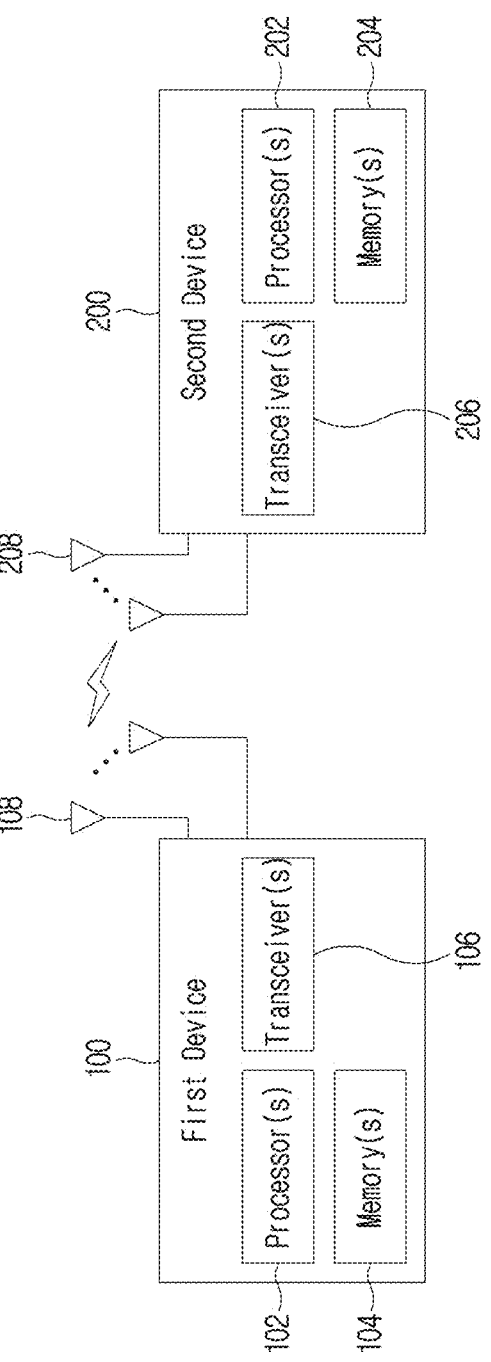

FIG. 16 illustrates a block diagram of a wireless communication device according to an embodiment of the present disclosure.

DETAILED DESCRIPTION

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

Figure 1:
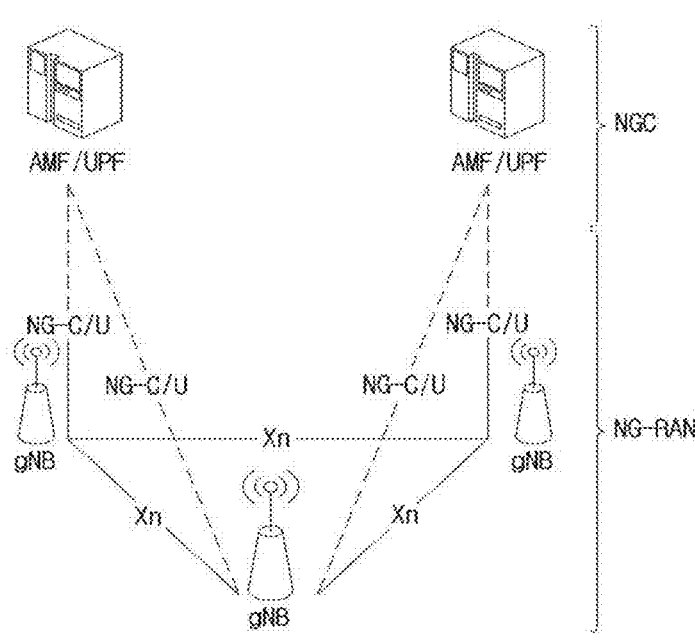
FIG. 1 illustrates a structure of a wireless communication system to which the present disclosure may be applied.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
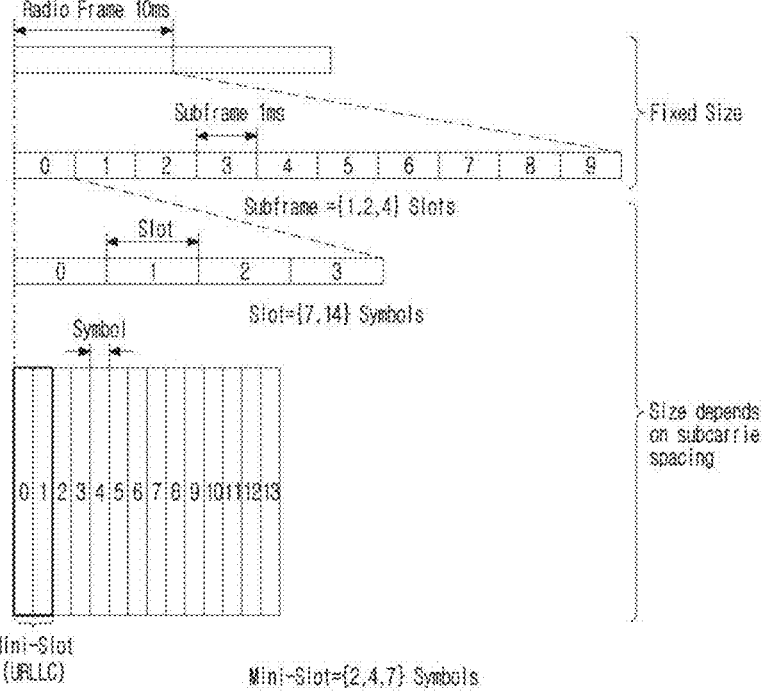
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, u). In addition, although it is assumed that a very low subcarrier spacing is not used in a very high carrier frequency, a used numerology may be selected independently from a frequency band. In addition, a variety of frame structures
according to a plurality of numerologies may be supported
in a NR system.

Hereinafter, an OFDM numerology and frame structure
which may be considered in a NR system will be described.
A plurality of OFDM numerologies supported in a NR
system may be defined as in the following Table 1.

TABLE 1

| μ | Δf = $2^μ$ · 15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier
spacings (SCS)) for supporting a variety of 5G services. For
example, when a SCS is 15 kHz, a wide area in traditional
cellular bands is supported, and when a SCS is 30 kHz/60
kHz, dense-urban, lower latency and a wider carrier band-
width are supported, and when a SCS is 60 kHz or higher,
a bandwidth wider than 24.25 GHz is supported to overcome
a phase noise. An NR frequency band is defined as a
frequency range in two types (FR1, FR2). FR1, FR2 may be
configured as in the following Table 2. In addition, FR2 may
mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a
variety of fields in a time domain is expresses as a multiple
of a time unit of $T_c=1/(\Delta f_{max}·N_f)$. Here, $\Delta f_{max}$ is $480·10^3$ Hz
and $N_f$ is 4096. Downlink and uplink transmission is con-
figured (organized) with a radio frame having a duration of
$T_r=1/(\Delta f_{max}N_f/100)·T_c=10$ ms. Here, a radio frame is con-
figured with 10 subframes having a duration of $T_{sf}=$
$(\Delta f_{max}N_f/1000)·T_c=1$ ms, respectively. In this case, there
may be one set of frames for an uplink and one set of frames
for a downlink. In addition, transmission in an uplink frame
No. i from a terminal should start earlier by $T_{TA}=(N_{TA}+$
$N_{TA,offset})T_c$ than a corresponding downlink frame in a cor-
responding terminal starts. For a subcarrier spacing configu-
ration μ, slots are numbered in an increasing order of
$n_s^μ∈\{0, . . . , N_{slot}^{subframe,μ}-1\}$ in a subframe and are
numbered in an increasing order of $n_{s,f}^μ∈\{0, . . . ,$
$N_{slot}^{frame,μ}-1\}$ in a radio frame. One slot is configured with
$N_{symb}^{slot}$ consecutive OFDM symbols and $N_{symb}^{slot}$ is deter-
mined according to CP. A start of a slot $n_s^μ$ in a subframe is
temporally arranged with a start of an OFDM symbol
$n_s^μN_{symb}^{slot}$ in the same subframe. All terminals may not
perform transmission and reception at the same time, which
means that all OFDM symbols of a downlink slot or an
uplink slot may not be used. Table 3 represents the number
of OFDM symbols per slot ($N_{symb}^{slot}$), the number of slots
per radio frame ($N_{slot}^{frame,μ}$) and the number of slots per
subframe ($N_{slot}^{subframe,μ}$) in a normal CP and Table 4 rep-
resents the number of OFDM symbols per slot, the number
of slots per radio frame and the number of slots per subframe
in an extended CP.

TABLE 3

| μ | $N_{symb}^{slot}$ | $N_{slot}^{frame, μ}$ | $N_{slot}^{subframe, μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, μ}$ | $N_{slot}^{subframe, μ}$ |
|---|---|---|---|
| 2 | 12 | 40 | 4 |

Figure 3:
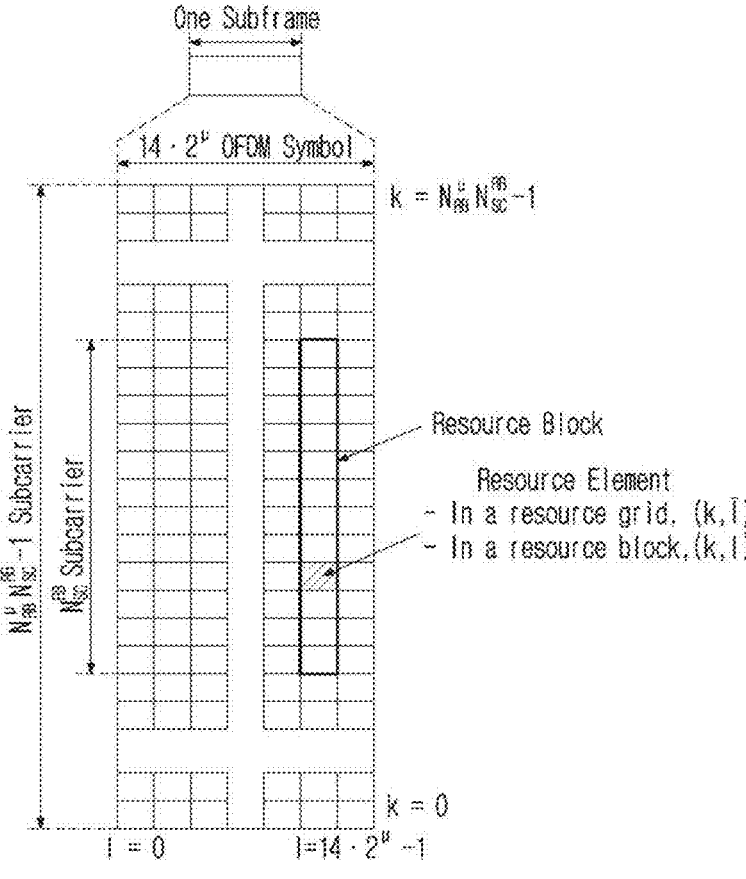
FIG. 3 illustrates a resource grid in a wireless communication system to which the present disclosure may be applied.

FIG. 2 is an example on μ=2 (SCS is 60 kHz), 1 subframe
may include 4 slots referring to Table 3. 1 subframe={1, 2,
4} slot shown in FIG. 2 is an example, the number of slots
which may be included in 1 subframe is defined as in Table
3 or Table 4. In addition, a mini-slot may include 2, 4 or 7
symbols or more or less symbols. Regarding a physical
resource in a NR system, an antenna port, a resource grid, a
resource element, a resource block, a carrier part, etc. may
be considered. Hereinafter, the physical resources which
may be considered in an NR system will be described in
detail. First, in relation to an antenna port, an antenna port
is defined so that a channel where a symbol in an antenna
port is carried can be inferred from a channel where other
symbol in the same antenna port is carried. When a large-
scale property of a channel where a symbol in one antenna
port is carried may be inferred from a channel where a
symbol in other antenna port is carried, it may be said that
2 antenna ports are in a QC/QCL (quasi co-located or quasi
co-location) relationship. In this case, the large-scale prop-
erty includes at least one of delay spread, doppler spread,
frequency shift, average received power, received timing.
FIG. 3 illustrates a resource grid in a wireless communica-
tion system to which the present disclosure may be applied.

In reference to FIG. 3, it is illustratively described that a
resource grid is configured with $N_{RB}^μN_{sc}^{RB}$ subcarriers in a
frequency domain and one subframe is configured with
$14·2^μ$ OFDM symbols, but it is not limited thereto. In an NR
system, a transmitted signal is described by OFDM symbols
of $2^μN_{symb}^{(μ)}$ and one or more resource grids configured with
$N_{RB}^μN_{sc}^{RB}$ subcarriers. Here, $N_{RB}^μ≤N_{RB}^{max,μ}$. The $N_{RB}^{max,μ}$
represents a maximum transmission bandwidth, which may
be different between an uplink and a downlink as well as
between numerologies.

In this case, one resource grid may be configured per μ
and antenna port p. Each element of a resource grid for μ and
an antenna port p is referred to as a resource element and is
uniquely identified by an index pair (k,l'). Here, k=0, . . . ,
$N_{RB}^μN_{sc}^{RB}-1$ is an index in a frequency domain and
l'=0, . . . , $2^μN_{symb}^{(μ)}-1$ refers to a position of a symbol in a
subframe. When referring to a resource element in a slot, an
index pair (k,l) is used. Here, l=0, . . . , $N_{symb}^μ-1$. A resource
element (k, l') for μ and an antenna port p corresponds to a
complex value, $a_{k,l'}^{(p,μ)}$. When there is no risk of confusion
or when a specific antenna port or numerology is not
specified, indexes p and μ may be dropped, whereupon a
complex value may be $a_{k,l'}^{(p)}$ or $a_{k,l'}$. In addition, a resource
block (RB) is defined as $N_{sc}^{RB}=12$ consecutive subcarriers
in a frequency domain.

Point A plays a role as a common reference point of a
resource block grid and is obtained as follows.

offsetToPointA for a primary cell (PCell) downlink rep-
resents a frequency offset between point A and the
lowest subcarrier of the lowest resource block over-
lapped with a SS/PBCH block which is used by a
terminal for an initial cell selection. It is expressed in
resource block units assuming a 15 kHz subcarrier
spacing for FRI and a 60 kHz subcarrier spacing for
FR2.

absoluteFrequencyPointA represents a frequency-position
of point A expressed as in ARFCN (absolute radio-
frequency channel number). Common resource blocks
are numbered from 0 to the top in a frequency domain
for a subcarrier spacing configuration μ. The center of
subcarrier 0 of common resource block 0 for a subcar-
rier spacing configuration μ is identical to 'point A'. A
relationship between a common resource block number
$n_{CRB}{}^{\mu}$ and a resource element (k,l) for a subcarrier
spacing configuration μ in a frequency domain is given
as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0
corresponds to a subcarrier centering in point A. Physical
resource blocks are numbered from 0 to $N_{BWP,i}{}^{size,\mu}-1$ in a
bandwidth part (BWP) and i is a number of a BWP. A
relationship between a physical resource block $n_{PRB}$ and a
common resource block $n_{CRB}$ in BWP i is given by the
following Equation 2.

$$n_{CRB}^{\mu} = n_{PRB}^{\mu} + N_{BWP,i}^{start,\mu} \qquad \text{[Equation 2]}$$

$N_{BWP,i}{}^{start,\mu}$ is a common resource block that a BWP starts
relatively to common resource block 0.

Figure 4:
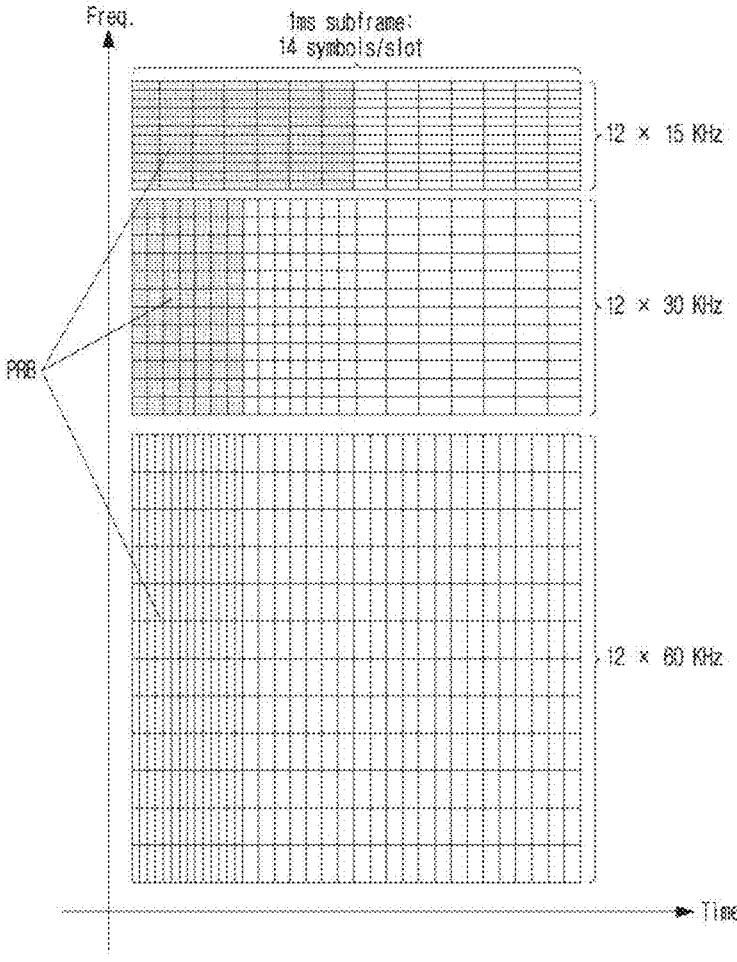
FIG. 4 illustrates a physical resource block in a wireless communication system to which the present disclosure may be applied.

FIG. 4 illustrates a physical resource block in a wireless
communication system to which the present disclosure may
be applied. And, FIG. 5 illustrates a slot structure in a
wireless communication system to which the present dis-
closure may be applied.

Figure 5:
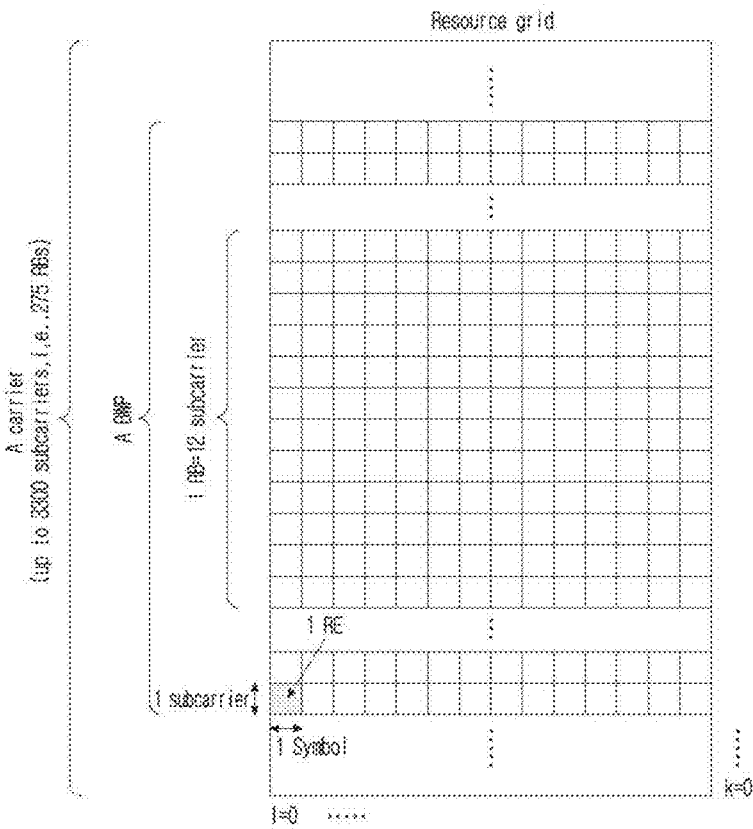
FIG. 5 illustrates a slot structure in a wireless communication system to which the present disclosure may be applied.

In reference to FIG. 4 and FIG. 5, a slot includes a
plurality of symbols in a time domain. For example, for a
normal CP, one slot includes 7 symbols, but for an extended
CP, one slot includes 6 symbols.

A carrier includes a plurality of subcarriers in a frequency
domain. An RB (Resource Block) is defined as a plurality of
(e.g., 12) consecutive subcarriers in a frequency domain. A
BWP (Bandwidth Part) is defined as a plurality of consecu-
tive (physical) resource blocks in a frequency domain and
may correspond to one numerology (e.g., an SCS, a CP
length, etc.). A carrier may include a maximum N (e.g., 5)
BWPs. A data communication may be performed through an
activated BWP and only one BWP may be activated for one
terminal. In a resource grid, each element is referred to as a
resource element (RE) and one complex symbol may be
mapped.

In an NR system, up to 400 MHZ may be supported per
component carrier (CC). If a terminal operating in such a
wideband CC always operates turning on a radio frequency
(FR) chip for the whole CC, terminal battery consumption
may increase. Alternatively, when several application cases
operating in one wideband CC (e.g., eMBB, URLLC, Mmtc,
V2X, etc.) are considered, a different numerology (e.g., a subcarrier spacing, etc.) may be supported per: frequency
band in a corresponding CC. Alternatively, each terminal
may have a different capability for the maximum bandwidth.
By considering it, a base station may indicate a terminal to
operate only in a partial bandwidth, not in a full bandwidth
of a wideband CC, and a corresponding partial bandwidth is
defined as a bandwidth part (BWP) for convenience. A BWP
may be configured with consecutive RBs on a frequency
axis and may correspond to one numerology (e.g., a sub-
carrier spacing, a CP length, a slot/a mini-slot duration).

Meanwhile, a base station may configure a plurality of
BWPs even in one CC configured to a terminal. For
example, a BWP occupying a relatively small frequency
domain may be configured in a PDCCH monitoring slot, and
a PDSCH indicated by a PDCCH may be scheduled in a
greater BWP.

Alternatively, when UEs are congested in a specific BWP,
some terminals may be configured with other BWP for load
balancing. Alternatively, considering frequency domain
inter-cell interference cancellation between neighboring
cells, etc., some middle spectrums of a full bandwidth may
be excluded and BWPs on both edges may be configured in
the same slot. In other words, a base station may configure
at least one DL/UL BWP to a terminal associated with a
wideband CC.

A base station may activate at least one DL/UL BWP of
configured DL/UL BWP(s) at a specific time (by L1 signal-
ing or MAC CE (Control Element) or RRC signaling, etc.).
In addition, a base station may indicate switching to other
configured DL/UL BWP (by L1 signaling or MAC CE or
RRC signaling, etc.). Alternatively, based on a timer, when
a timer value is expired, it may be switched to a determined
DL/UL BWP. Here, an activated DL/UL BWP is defined as
an active DL/UL BWP.

But, a configuration on a DL/UL BWP may not be
received when a terminal performs an initial access proce-
dure or before a RRC connection is set up, so a DL/UL BWP
which is assumed by a terminal under these situations is
defined as an initial active DL/UL BWP.

Figure 6:
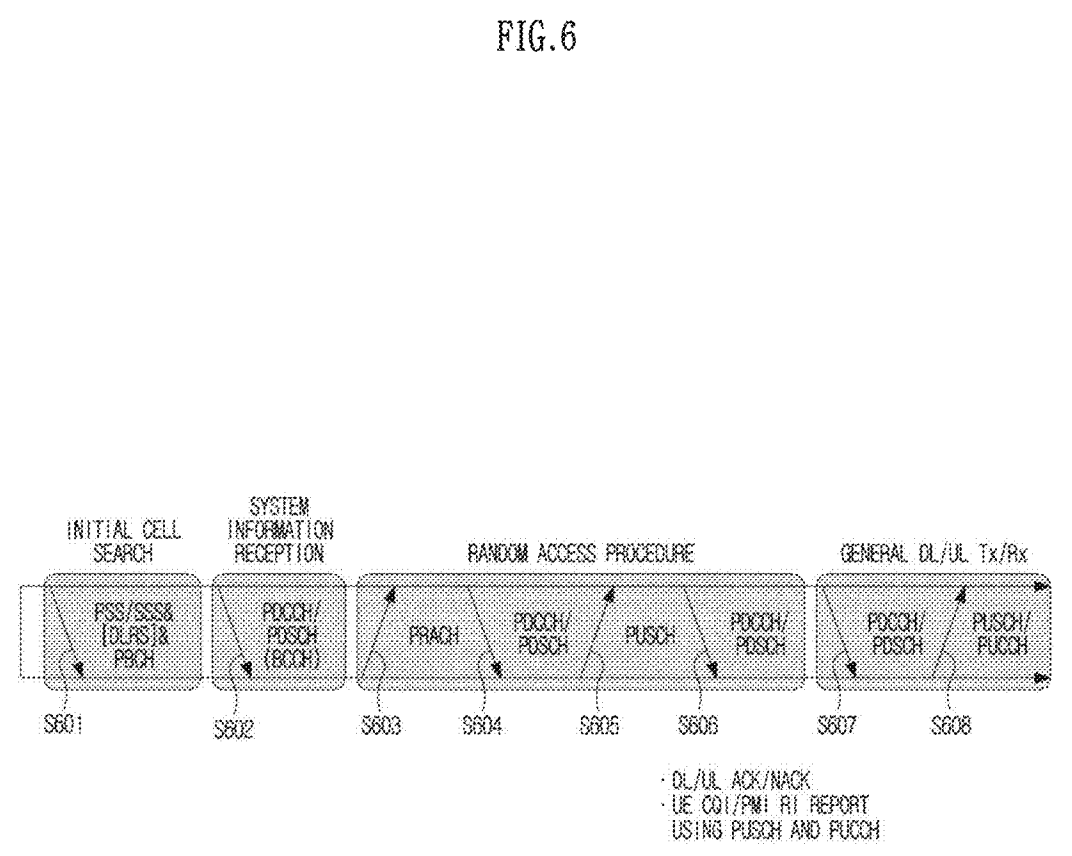

FIG. 6 illustrates physical channels used in a wireless
communication system to which the present disclosure may
be applied and a general signal transmission and reception
method using them.

In a wireless communication system, a terminal receives
information through a downlink from a base station and
transmits information through an uplink to a base station.
Information transmitted and received by a base station and
a terminal includes data and a variety of control information
and a variety of physical channels exist according to a type/a
usage of information transmitted and received by them.

When a terminal is turned on or newly enters a cell, it
performs an initial cell search including synchronization
with a base station or the like (S601). For the initial cell
search, a terminal may synchronize with a base station by
receiving a primary synchronization signal (PSS) and a
secondary synchronization signal (SSS) from a base station
and obtain information such as a cell identifier (ID), etc.
After that, a terminal may obtain broadcasting information
in a cell by receiving a physical broadcast channel (PBCH)
from a base station. Meanwhile, a terminal may check out a
downlink channel state by receiving a downlink reference
signal (DL RS) at an initial cell search stage.

A terminal which completed an initial cell search may
obtain more detailed system information by receiving a
physical downlink control channel (PDCCH) and a physical
downlink shared channel (PDSCH) according to informa-
tion carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/ PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent. A terminal measures CSI based on the configuration information related to CSI.

The CSI measurement may include (1) a process in which a terminal receives a CSI-RS and (2) a process in which CSI is computed through a received CSI-RS and detailed description thereon is described after.

In CSI-RS, RE (resource element) mapping of CSI-RS resource is set in time and frequency domains by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

The NR system supports more flexible and dynamic CSI measurement and reporting. Here, the CSI measurement may include a procedure of receiving CSI-RS and acquiring CSI by computing the received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist.

Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number(S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement

NZP CSI-RS resource for interference measurement

NZP CSI-RS resource for channel measurement

In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resources-ForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resource setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.

Each NZP CSI-RS port configured for interference measurement corresponds to an interference transmission layer.

All interference transmission layers of an NZP CSI-RS port for interference measurement consider EPRE (energy per resource element) ratio.

A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with $N \geq 1$ CSI-ReportConfig reporting setting, $M \geq 1$ CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset (Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for channel/interference.

Additionally, a terminal reports the number of CSI which may be calculated at the same time.

The network may activate and deactivate the configured SP CSI-RS/CSI-IM resource set of the serving cell by sending a SP CSI-RS/CSI-IM resource set activation/deactivation MAC CE. A configured SP CSI-RS/CSI-IM resource set may be initially deactivated upon configuration and after handover.

The MAC entity may perform the following operations.
1> if the MAC entity receives an SP CSI-RS/CSI-IM Resource Set Activation/Deactivation MAC CE on a Serving Cell:
2> indicating to lower layers the information regarding the SP CSI-RS/CSI-IM Resource Set Activation/Deactivation MAC CE.

And, the network may select among the configured aperiodic CSI trigger states of the serving cell by transmitting an aperiodic CSI trigger state sub-selection MAC CE.

The MAC entity may perform the following operations.
1> if the MAC entity receives an Aperiodic CSI trigger State Subselection MAC CE on a Serving Cell:
2> indicating to lower layers the information regarding Aperiodic CSI trigger State Subselection MAC CE.

Type II Codebook

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and the UE configured with higher layer parameter codebookType set to 'typeII'

The values of N1 and N1 are individually configured with higher layer parameters 'n1-n2-codebookSubsetRestriction' and 'CodebookConfig-N2'. The supported configurations of (N1, N2) and the corresponding values of (O1, O2) for a given number of CSI-RS ports are shown in Table 6 below.

TABLE 6

| Number of CSI-RS antenna ports, $P_{CSI-RS}$ | $(N_1, N_2)$ | $(O_1, O_2)$ |
|---|---|---|
| 4 | (2, 1) | (4, 1) |
| 8 | (2, 2) | (4, 4) |
|  | (4, 1) | (4, 1) |
| 12 | (3, 2) | (4, 4) |
|  | (6, 1) | (4, 1) |
| 16 | (4, 2) | (4, 4) |
|  | (8, 1) | (4, 1) |
| 24 | (4, 3) | (4, 4) |
|  | (6, 2) | (4, 4) |
|  | (12, 1) | (4, 1) |
| 32 | (4, 4) | (4, 4) |
|  | (8, 2) | (4, 4) |
|  | (16, 1) | (4, 1) |

The L value is configured for the higher layer parameter 'numberOfbeams', where if the value of $P_{CSI-RS}$ is 4, the value of L is 2, and if the value of $P_{CSI-RS}$ is greater than 4, the value of L is {2, 3, 4}.

The value of NPSK is configured for the higher layer parameter phaseAlphabetSize, and $N_{PSK}$ belongs to {4, 8}.

The UE is configured by configuring the higher layer parameter subbandAmplitude to 'true' or 'false'.

The UE may not report RI>2.

When the v value associated with the RI value is less than 2, the codebook indices i1 and i2 corresponding to each PMI value are respectively as shown in Equation 3 and Equation 4 below.

$$i_1 = \begin{cases} [i_{1,1} \quad i_{1,2} \quad i_{1,3,1} \quad i_{1,4,1}] & v = 1 \\ [i_{1,1} \quad i_{1,2} \quad i_{1,3,1} \quad i_{1,4,1} \quad i_{1,3,2} \quad i_{1,4,2}] & v = 2 \end{cases} \qquad \text{[Equation 3]}$$

$$i_2 = \begin{cases} [i_{2,1,1}] & \text{subbandAmplitude = 'false', } v = 1 \\ [i_{2,1,1} \quad i_{2,1,2}] & \text{subbandAmplitude = 'false', } v = 2 \\ [i_{2,1,1} \quad i_{2,2,1}] & \text{subbandAmplitude = 'true', } v = 1 \\ [i_{2,1,1} \quad i_{2,2,1} \quad i_{2,1,2} \quad i_{2,2,2}] & \text{subbandAmplitude = 'true', } v = 2 \end{cases} \qquad \text{[Equation 4]}$$

The L vector combined by the codebook may be identified with indices $i_{1,1}$ and $i_{1,2}$. Here, $i_{1,1}$ and $i_{1,2}$ may each be implemented as Equation 5 and Equation 6.

$$i_{1,1} = \{q_1, q_2\} q_1 \in \{0, 1, \ldots, O_1 - 1\}, q_2 \in \{0, 1, \ldots, O_2 - 1\} \quad \text{[Equation 5]}$$

$$i_{1,2} \in \left\{0, 1, \ldots, \binom{N_1 N_2}{L} - 1\right\} \quad \text{[Equation 6]}$$

And, n1 and n2 related to each of $N_1$ and $N_2$ found through $i_{1,2}$ may be implemented as in Equation 7.

$$n_2 = \left[n_1^{(0)}, \ldots, n_1^{(L-1)}\right], n_2 = \left[n_2^{(0)}, \ldots, n_2^{(L-1)}\right], \quad \text{[Equation 7]}$$

$$n_1^{(i)} \in \{0, 1, \ldots, N_1 - 1\}, n_2^{(i)} \in \{0, 1, \ldots, N_2 - 1\}$$

And, combinatorial coefficients may be implemented as shown in Equation 8 and Table 7.

$$C(x, y) = \begin{cases} \binom{x}{y} & x \geq y \\ 0 & x < y \end{cases} \quad \text{[Equation 8]}$$

TABLE 7

| x | y | | | |
|---|---|---|---|---|
| | 1 | 2 | 3 | 4 |
| 0 | 0 | 0 | 0 | 0 |
| 1 | 1 | 0 | 0 | 0 |
| 2 | 2 | 1 | 0 | 0 |
| 3 | 3 | 3 | 1 | 0 |
| 4 | 4 | 6 | 4 | 1 |
| 5 | 5 | 10 | 10 | 5 |
| 6 | 6 | 15 | 20 | 15 |
| 7 | 7 | 21 | 35 | 35 |
| 8 | 8 | 28 | 56 | 70 |
| 9 | 9 | 36 | 84 | 126 |
| 10 | 10 | 45 | 120 | 210 |
| 11 | 11 | 55 | 165 | 330 |
| 12 | 12 | 66 | 220 | 495 |
| 13 | 13 | 78 | 286 | 715 |
| 14 | 14 | 91 | 364 | 1001 |
| 15 | 15 | 105 | 455 | 1365 |

The strongest coefficient in layer 1 (l=1, . . . , v) may be identified by $i_{1,3,l} \in \{1, \ldots, 2L-1\}$. The amplitude coefficient indicators $i_{1,4,l}$ and $i_{2,2,l}$ may be equal to Equation 9.

$$i_{1,4,l} = \left[k_{l,0}^{(1)}, k_{l,1}^{(1)}, \ldots, k_{l,2L-1}^{(1)}\right], i_{2,2,l} = \left[k_{l,0}^{(2)}, k_{l,1}^{(2)}, \ldots, k_{l,2L-1}^{(2)}\right], \quad \text{[Equation 9]}$$

$$k_{l,i}^{(1)} \in \{0, 1, \ldots, 7\}, k_{l,i}^{(2)} \in \{0, 1\}$$

The phase coefficient indicator may be implemented as in Equation 10.

$$i_{2,1,l} = [c_{l,0}, c_{l,1}, \ldots, c_{l,2L-1}], \quad \text{[Equation 10]}$$

The mapping from $$k_{l,i}^{(1)}$$

to the amplitude coefficient $$p_{l,i}^{(1)}$$

can be as shown in Table 8, and the mapping from $$k_{l,i}^{(2)}$$

to the amplitude coefficient $$p_{l,i}^{(2)}$$

can be as shown in Table 8. The amplitude coefficient may be equal to Equation 11.

$$p_{l,i}^{(1)} = \left[p_{l,0}^{(1)}, p_{l,1}^{(1)}, \ldots, p_{l,2L-1}^{(1)}\right], p_{l,i}^{(2)} = \left[p_{l,0}^{(2)}, p_{l,1}^{(2)}, \ldots, p_{l,2L-1}^{(2)}\right] \quad \text{[Equation 11]}$$

TABLE 8

| $k_{l,i}^{(1)}$ | $P_{l,i}^{(1)}$ |
|---|---|
| 0 | 0 |
| 1 | $\sqrt{\dfrac{1}{64}}$ |
| 2 | $\sqrt{\dfrac{1}{32}}$ |
| 3 | $\sqrt{\dfrac{1}{16}}$ |
| 4 | $\sqrt{\dfrac{1}{8}}$ |
| 5 | $\sqrt{\dfrac{1}{4}}$ |
| 6 | $\sqrt{\dfrac{1}{2}}$ |
| 7 | 1 |

TABLE 9

| $k_{l,i}^{(2)}$ | $p_{l,i}^{(2)}$ |
|---|---|
| 0 | 0 |

Type II Port Selection Codebook For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and the UE configured with higher layer parameter set codebookType to 'typeII-PortSelection'

The number of CSI-RS ports is given by $P_{CSI-RS} \in$ {4,8, 12,16,24,32} as configured by higher layer parameter nrofPorts.

The value of L is configured with the higher layer parameter numberOfBeams, where L=2 when $P_{CSI-RS}$=4 and L∈{2,3,4} when $P_{CSI-RS}$>4.

The value of d is configured with the higher layer parameter 'portSelectionSamplingSize', where d may be equal to Equation 12.

$$d \le \min\left(\frac{P_{CSI-RS}}{2}, L\right) \qquad \text{[Equation 12]}$$

The value of $N_{PSK}$ is configured with the upper layer parameter 'phaseAlphabetSize', and $N_{PSK}$ belongs to {4, 8}.

The UE is configured with the higher layer parameter 'subbandAmplitude' to 'true' or 'false'.

The UE shall not report RI>2

The UE may be configured with the higher layer parameter "typeII-PortSelectionRIRestriction". The bitmap parameter "typeII-PortSelectionRIRestriction" forms the bit sequences $r_1$ and $r_0$. Here, $r_0$ is LSB and $r_1$ is MSB. If $r_1$ is zero, i∈{0, 1}, PMI and RI reports do not correspond to any precoder associated with v+1 layers.

If the v value associated with the RI value is less than 2, the codebook indices $i_1$ and $i_2$ corresponding to each PMI value are as shown in Equation 13 below.

$$i_1 = \begin{cases} [\ i_{1,1} \quad i_{1,3,1} \quad i_{1,4,1}\ ] & v = 1 \\ [\ i_{1,1} \quad i_{1,3,1} \quad i_{1,4,1} \quad i_{1,3,2} \quad i_{1,4,2}] & v = 2 \end{cases}, \qquad \text{[Equation 13]}$$

$$i_2 = \begin{cases} [i_{2,1,1}] & subbandAmplitude = \text{'false'}, v = 1 \\ [i_{2,1,1} \quad i_{2,1,2}] & subbandAmplitude = \text{'false'}, v = 2 \\ [i_{2,1,1} \quad i_{2,2,1}] & subbandAmplitude = \text{'true'}, v = 1 \\ [i_{2,1,1} \quad i_{2,2,1} \quad i_{2,1,2} \quad i_{2,2,2}] & subbandAmplitude = \text{'true'}, v = 2 \end{cases}$$

In Equation 13, the L vectors combined by the codebook are identified by the $i_{1,1}$ and $i_{1,2}$ indices, and each value is as shown in Equation 14 below.

$$i_{1,1} \in \left\{0, 1, \ldots, \left\lceil \frac{P_{CSI-RS}}{2d} \right\rceil - 1\right\} \qquad \text{[Equation 14]}$$

The strongest coefficient in layer 1 (e.g., l=1, . . . , v) may be identified by $i_{1,3,l} \in$ {0, 1, . . . , 2L−1}.

Amplitude coefficient indicators $i_{1,4,l}$ and $i_{2,2,l}$ may be equal to Equation 15.

$$i_{1,4,l} = \left[k_{l,0}^{(1)}, k_{l,1}^{(1)}, \ldots, k_{l,2L-1}^{(1)}\right], i_{2,2,l} = \left[k_{l,0}^{(2)}, k_{l,1}^{(2)}, \ldots, k_{l,2L-1}^{(2)}\right], \qquad \text{[Equation 15]}$$

$$k_{l,i}^{(1)} \in \{0, 1, \ldots, 7\}, k_{l,i}^{(2)} \in \{0, 1\}$$

The mapping from $$k_{l,i}^{(1)}$$

to the amplitude coefficient $$p_{l,i}^{(1)}$$

may be as shown in Table 8, and the mapping from $$k_{l,i}^{(2)}$$

to the amplitude coefficient $$p_{l,i}^{(2)}$$

may be as shown in Table 8. The amplitude coefficient may be equal to Equation 11.

Enhanced Type II Codebook

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and UE configured with higher layer parameter codebookType set to 'typeII-r16'

The values of $N_1$ and $N_2$ are configured with the higher layer parameter n1-n2-codebookSubsetRestriction-r16. The supported configurations of $(N_1,N_2)$ for a given number of CSI-RS ports and the corresponding values of $(O_1,O_2)$ are given in Table 5.2.2.2.1-2. The number of CSI-RS ports, $P_{CSI-RS}$, is 2N1N2.

The values of L, β and $p_v$ are determined by the higher layer parameter paramCombination-r16, where the mapping is given in Table 10.

TABLE 10

| paramCombination-r16 | L | v ∈ {1, 2} | v ∈ {3, 4} | β |
|---|---|---|---|---|
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ¼ | ¼ | ½ |
| 7 | 6 | ¼ | — | ½ |
| 8 | 6 | ¼ | — | ¾ |

PMI values may correspond to the codebook indices of $i_1$ and $i_2$, and it can be implemented as in Equation 16. The precoding matrix indicated by PMI can be determined from the L+$M_v$ vector.

[Equation 16]

$$i_1 = \begin{cases} [i_{1,1} \ \ i_{1,2} \ \ i_{1,5} \ \ i_{1,6,1} \ \ i_{1,7,1} \ \ i_{1,8,1}] & v = 1 \\ [i_{1,1} \ \ i_{1,2} \ \ i_{1,5} \ \ i_{1,6,1} \ \ i_{1,7,1} \ \ i_{1,8,1} \ \ i_{1,6,2} \ \ i_{1,7,2} \ \ i_{1,8,2}] & v = 2 \\ [i_{1,1} \ \ i_{1,2} \ \ i_{1,5} \ \ i_{1,6,1} \ \ i_{1,7,1} \ \ i_{1,8,1} \ \ i_{1,6,2} \ \ i_{1,7,2} \ \ i_{1,8,2} \ \ i_{1,6,3} \ \ i_{1,7,3} \ \ i_{1,8,3}] & v = 3 \\ [i_{1,1} \ \ i_{1,2} \ \ i_{1,5} \ \ i_{1,6,1} \ \ i_{1,7,1} \ \ i_{1,8,1} \ \ i_{1,6,2} \ \ i_{1,7,2} \ \ i_{1,8,2} \ \ i_{1,6,3} \ \ i_{1,7,3} \ \ i_{1,8,3} \ \ i_{1,6,4} \ \ i_{1,7,4} \ \ i_{1,8,4}] & v = 4 \end{cases}$$

$$i_2 = \begin{cases} [i_{2,3,1} \ \ i_{2,4,1} \ \ i_{2,5,1}] & v = 1 \\ [i_{2,3,1} \ \ i_{2,4,1} \ \ i_{2,5,1} \ \ i_{2,3,2} \ \ i_{2,4,2} \ \ i_{2,5,2}] & v = 2 \\ [i_{2,3,1} \ \ i_{2,4,1} \ \ i_{2,5,1} \ \ i_{2,3,2} \ \ i_{2,4,2} \ \ i_{2,5,2} \ \ i_{2,3,3} \ \ i_{2,4,3} \ \ i_{2,5,3}] & v = 3 \\ [i_{2,3,1} \ \ i_{2,4,1} \ \ i_{2,5,1} \ \ i_{2,3,2} \ \ i_{2,4,2} \ \ i_{2,5,2} \ \ i_{2,3,3} \ \ i_{2,4,3} \ \ i_{2,5,3} \ \ i_{2,3,4} \ \ i_{2,4,4} \ \ i_{2,5,4}] & v = 4 \end{cases}$$

The amplitude coefficient indicators $i_{2,3,1}$ and $i_{2,4,1}$ can be implemented as in Equation 17, and the phase coefficient indicators $i_{2,5,1}$ can be implemented as in Equation 18.

$$i_{2,3,l} = \left[k_{l,0}^{(1)} k_{l,1}^{(1)}\right], \ i_{2,4,l} = \left[k_{l,0}^{(2)} \dots k_{l,M_v-1}^{(2)}\right], \quad \text{[Equation 17]}$$

$$k_{l,f}^{(2)} = \left[k_{l,0,f}^{(2)} \dots k_{l,2L-1,f}^{(2)}\right],$$

$$k_{l,p}^{(1)} \in \{0, 1, \dots, 15\}, \ k_{l,i,f}^{(2)} \in \{0, \dots, 7\}$$

$$i_{2,5,l} = \left[c_{l,0} \dots c_{l,M_v-1}\right], \quad \text{[Equation 18]}$$

$$c_{l,f} = \left[c_{l,0,f} \dots c_{l,2L-1,f}\right], \ c_{l,t,f} \in \{0, \dots, 15\}$$

Enhanced Type II Port Selection Codebook

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and UE configured with higher layer parameter codebookType set to 'typeII-r16'

The number of CSI-RS ports may be configured the same as the Type II port selection codebook.

The value of d is configured with the higher layer parameter 'portSelectionSamplingSize-r16', where $d \in \{1,2,3,4\}$ and $d \le L$.

The values of L, $\beta$ and $p_v$ are determined by the higher layer parameter paramCombination-r16, where the mapping is given in Table 11.

TABLE 11

| paramCombination-r16 | L | $v \in \{1, 2\}$ | $v \in \{3, 4\}$ | $\beta$ |
|---|---|---|---|---|
| | | $p_v$ | | |
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/4 | 1/4 | 1/2 |

The UE may report the RI value u according to the configured higher layer parameter 'typeII-PortSelectionRI-Restriction-r16', and the UE may not report v>4. The UE is configured with the higher layer bitmap parameter 'typeII-PortSelectionRI-Restriction-r16', which forms the bit sequence $r_3$, $r_2$, $r_1$, $r_0$. Here, $r_0$ may be the least significant bit (LSB) and $r_3$ may be the most significant bit (MSB). If $r_i$ is 0, then $i \in \{0,1,2,3\}$ and PMI and RI reporting cannot correspond to the precoder associated with the v=i+1 layer. The PMI value corresponds to the codebook index of $i_1$ and $i_2$, which can be implemented as in Equation 16.

Non-zero coefficients, amplitude coefficients, amplitude and phase coefficient indicators, and codebook indicators $(i_{1,5}$ and $i_{1,6})$ for each layer of the enhanced Type II port selection codebook may be the same as the non-zero coefficient, amplitude coefficient, amplitude and phase coefficient indicator, and codebook indicator $(i_{1,5}$ and $i_{1,6})$ of each layer of the enhanced Type II codebook.

Further Enhanced Type II Port Selection Codebook

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and the UE configured with higher layer parameter codebookType set to 'typeII-PortSelection-r17'

The number of CSI-RS ports may be configured the same as the Type II port selection codebook.

The values $\alpha$, M, and $\beta$ are determined by the higher layer parameter 'paramCombination-r17' and may be defined/mapped as shown in Table 12.

TABLE 12

| paramCombination-r17 | M | $\alpha$ | $\beta$ |
|---|---|---|---|
| 1 | 1 | 3/4 | 1/2 |
| 2 | 1 | 1 | 1/2 |
| 3 | 1 | 1 | 3/4 |
| 4 | 1 | 1 | 1 |
| 5 | 2 | 1/2 | 1/2 |
| 6 | 2 | 3/4 | 1/2 |
| 7 | 2 | 1 | 1/2 |
| 8 | 2 | 1 | 3/4 |

The parameter $N \in \{2,4\}$ may be configured with the higher layer parameter 'valueOfN' when M is 2. The parameter $R \in \{1,2\}$ is configured with the higher layer parameter 'numberOfPMI-SubbandsPerCQI-Subband-r17' when M=2, and it may be configured to R=1 when M=1. The UE may report the RI value v according to the configured higher layer parameter 'typeII-PortSelectionRI-Restriction-r17', and the UE may not report u>4.

The UE is configured with the higher layer bitmap parameter 'typeII-PortSelectionRI-Restriction-r16', which forms the bit sequence $r_3$, $r_2$, $r_1$, $r_0$. Here, $r_0$ may be the least significant bit (LSB) and r3 may be the most significant bit (MSB). If $r_i$ is 0, then $i \in \{0,1,2,3\}$ and PMI and RI reporting cannot correspond to the precoder associated with the v=i+1 layer. The PMI value corresponds to the codebook index of $i_1$ and $i_2$, which can be implemented as in Equation 16.

The PMI value corresponds to the codebook index of $i_1$ and $i_2$, which can be implemented as in Equation 16. The precoding matrix indicated by PMI can be determined from the L+M vector. L may be $K_1/2$ and $K_1$ may be $\alpha P_{CSI\text{-}RS}$.

The amplitude coefficient indicators $i_{2,3,l}$ and $i_{2,4,l}$ can be implemented as in Equation 17, and the phase coefficient indicators $i_{2,5,l}$ can be implemented as in Equation 18.

A bitmap whose non-zero bits identify the coefficients reported in $i_{2,4,l}$ and $i_{2,5,l}$ may be represented by $i_{1,7,l}$. Equations related to $i_{1,7,l}$ may be implemented as Equation 19.

$$i_{1,7,l} = \left[k_{l,0}^{(3)} \ldots k_{l,M-1}^{(3)}\right], \, k_{l,f}^{(3)} = \left[k_{l,0,f}^{(3)} \ldots k_{l,K_2-1,f}^{(3)}\right], \, k_{l,l,f}^{(3)} \in \{0,1\} \quad \text{[Equation 19]}$$

$$\text{Here, } K_l^{NZ} = \sum_{i=0}^{K_1-1} \sum_{f=0}^{M-1} k_{l,i,f}^{(3)} \leq K_0$$

is the number of nonzero coefficient for layer l=1, ..., v and $$K^{NZ} = \sum_{l=1}^{v} K_l^{NZ} \leq 2K_0$$

is the total number of nonzero coefficients. If v≤2 and $K^{NZ}=K_1 Mv$, $i_{1,7,l}$ is not reported.

CSI Reporting Method and Resource Configuration Method Based on Compression of Time Domain Information As an example of the UE's CSI feedback method, one UE may report CSI based on a specific point in time. Therefore, when the channel between the base station and the UE has time-varying characteristics due to movement of the base station/UE and/or changes in the surrounding environment of the base station/UE, CSI reporting values based on one specific point in time may decrease in accuracy over time.

In order to overcome the above-mentioned shortcomings, the base station may indicate/configure the UE to report CSI for multiple time points together. If CSI for multiple time points is reported together, the overhead for the corresponding CSI feedback may increase.

In order to secure/prevent such an increase in overhead, it is assumed that there is a tendency (e.g., correlation) in the time domain between CSI for multiple time points. The UE may compress and report time domain information based on trends, thereby reducing CSI overhead.

For similar reasons, the UE may perform compression in the frequency domain using the tendency between CSIs in the frequency domain to construct a codebook (e.g., an enhanced type II codebook) and report it.

Hereinafter, a method of configuring resources and a reporting method of the UE to support CSI reporting (e.g., CRI/RI/PMI/CQI/LI reporting) based on compression in the time domain will be described.

FIG. 7 is a diagram for describing a CSI transmission operation of a UE in a wireless communication system to which the present disclosure may be applied.

The UE may receive first configuration information related to a plurality of CSI-RS (reference signal) resources from the base station (S710).

Here, the CSI-RS resource may include an NZP/ZP CSI-RS resource (or/and a group of NZP/ZP CSI-RS resources) or/and a CSI-RS port (or/and a CSI-RS port group).

The UE may receive separate configuration information related to one or more resource sets from the base station. Here, the resource set may include one or more CSI-RS resources. That is, a plurality of CSI-RS resources may be grouped into one or more resource sets.

Configuration information may be transmitted from the base station to the UE through a single RRC signaling, but is not limited thereto. Configuration information may be individually transmitted from the base station to the UE.

The UE may receive a CSI-RS based on a plurality of CSI-RS resources from the base station (S720).

The UE may receive CSI-RS based on a plurality of CSI-RS resources included in one or more resource sets configured by the base station.

Based on the CSI-RS, the UE may transmit CSI using at least one bitmap related to the location (or position) of the non-zero coefficient to the base station (S730).

Here, the at least one bitmap may include information about the location of a non-zero coefficient in at least one frequency domain basic vector and at least one space domain basic vector corresponding to a combination of a specific time domain (or/and Doppler domain) basic vector.

As an example, at least one bitmap may be configured/defined for each at least one frequency domain basic vector. As another example, at least one bitmap may be configured/defined for each at least one spatial domain basic vector. As another example, at least one bitmap may be configured/defined for each at least one time domain basic vector (or/and a specific time domain basic vector).

As an example, assume that each of at least one bitmap corresponds to at least one time domain basic vector (or/and a specific time domain basic vector). At least one time domain basic vector-specific (or/and layer-specific) bitmap may include information about the location of non-zero coefficients in the spatial domain and the time domain.

Specifically, Q two-dimensional bitmaps may be applied to indicate the locations (or positions) of non-zero coefficients. The qth (q=1, ..., Q) two-dimensional bitmap may correspond to the qth selected time domain basic vector (i.e., Doppler domain basic vector). It means that for each layer, the location of the non-zero coefficient of SD (spatial domain)-FD (frequency domain) may be different for each selected Doppler domain basic vector.

As an example of the present disclosure, the UE may receive first information from the base station indicating to use at least one bitmap corresponding to each of at least one spatial domain basic vector or at least one bitmap corresponding to each frequency domain basic vector.

That is, the UE may receive first information indicating whether to use a bitmap defined for each spatial domain or a bitmap defined for each frequency domain from the base station. Here, the first information may be received through at least one of DCI, MAC-CE, RRC message, or SIB.

The UE may transmit CSI including second information about the bitmap used by the UE (when calculating CSI) among at least one bitmap corresponding to each of at least one spatial domain basic vector or at least one bitmap corresponding to each of at least one frequency domain basic vector to the base station.

That is, the UE may report to the base station whether to use a bitmap defined for each spatial domain or second information about the bitmap used when measuring CSI among the bitmaps defined for each frequency domain. Here, the information may be included in part 1 of the CSI and transmitted to the base station.

As an example of the present disclosure, the UE may select a combination of a specific time domain basic vector corresponding to a specific frequency domain basic vector (among a plurality of frequency domains) among at least one frequency domain basic vector.

Specifically, the UE may select/fix one specific frequency domain basis vector among at least one frequency domain basic vector. Additionally, the UE may select a combination of specific time domain basic vectors among a plurality of time domain basic vectors corresponding to one selected/fixed specific frequency domain basic vector.

Here, the number of specific frequency domain basic vectors may be one or more. Also, a combination of specific time domain basic vectors may mean a combination of one or more time domain basic vectors.

The UE may transmit CSI including a (non-zero) coefficient corresponding to a combination of a specific frequency domain basic vector and a specific time domain basic vector to the base station based on at least one bitmap (i.e., a bitmap defined for each spatial domain) corresponding to each of at least one spatial domain basic vector. That is, the UE may transmit CSI containing a codebook composed of the corresponding (non-zero) coefficients to the base station.

As another example of the present disclosure, the UE may select a combination of a specific time domain basic vector (among a plurality of frequency domains) corresponding to a specific spatial domain basic vector among at least one spatial domain basic vector. The UE may select a combination of a specific time domain basic vector from among a plurality of frequency domains corresponding to a specific space domain basic vector.

Specifically, the UE may select/fix one specific spatial domain basic vector among at least one spatial domain basic vector. Additionally, the UE may select a combination of specific time domain basic vectors among a plurality of time domain basic vectors corresponding to one selected/fixed specific spatial domain basic vector.

Here, the number of specific spatial domain basic vectors may be one or more.

Based on at least one bitmap (i.e., a bitmap defined for each frequency domain) corresponding to each of at least one frequency domain basic vector, the UE may transmit CSI including a (non-zero) coefficient corresponding to a combination of a specific space domain basic vector and a specific time domain basic vector to the base station.

As another example of the present disclosure, the UE may select a combination of a specific time domain basic vector for at least one spatial domain basic vector.

Based on at least one bitmap corresponding to each of at least one frequency domain basic vector, the UE may transmit CSI including a (non-zero) coefficient corresponding to a combination of at least one frequency domain basic vector and a specific time domain basic vector to the base station. That is, the UE m ay transmit CSI including a codebook composed of the corresponding (non-zero) coefficients to the base station.

As another example of the present disclosure, the UE may select a combination of specific time domain basic vectors for all at least one frequency domain basic vector.

Based on at least one bitmap corresponding to each of at least one spatial domain basic vector, the UE may transmit CSI including a (non-zero) coefficient corresponding to a combination of at least one spatial domain basic vector and a specific time domain basic vector to the base station. That is, the UE may transmit CSI including a codebook composed of the corresponding (non-zero) coefficients to the base station.

FIG. 8 is a diagram for describing the CSI reception operation of a base station in a wireless communication system to which the present disclosure can be applied.

The base station may transmit configuration information related to a plurality of CSI-RS resources to the UE (S810).

Additionally or alternatively, the base station may transmit to the UE at least one of information related to a resource set consisting of CSI-RS resources and gap symbols/slots, or information related to a time window.

The base station may transmit CSI-RS based on multiple CSI-RS resources to the UE (S820). That is, the base station may transmit RS for channel state measurement to the UE.

The base station may receive CSI from the UE using at least one bitmap related to the location of the non-zero coefficient based on the CSI-RS (S830).

Steps S810, S820, and S830 and related parameters/operations may correspond to steps S710, S720, and S730 and related parameters/operations, SO overlapping descriptions will be omitted.

Hereinafter, the CSI reporting method based on compression in the time domain and the resource configuration method to support it will be described in detail.

When a resource set consisting of a plurality of resources is configured/indicated to the UE, the UE may detect the time domain characteristics of the channel based on the plurality of resources in the resource set.

For example, the UE may obtain correlation information in the time domain and report it to the base station. As a method for reporting correlation information in the time domain, the above-described DFT matrix-based reporting method (i.e., enhanced Type II codebook reporting method) may be applied.

For example, assuming N different amplitudes/phase coefficients in the time domain, N coefficients may be expressed using M DFT vectors among the N*O DFT vectors of an oversampled DFT matrix of N*O size. Here, O may mean an oversampling coefficient.

The above-described method may be expressed as Equation 20.

$$
\begin{bmatrix} c_0 \\ c_1 \\ c_2 \\ \vdots \\ c_{N-1} \end{bmatrix} = \tilde{c}_0 \cdot v_{n_0} + \tilde{c}_1 \cdot v_{n_1} + \ldots + \tilde{c}_{M-1} \cdot v_{n_{M-1}}
$$

In Equation 20, $C_i$ may mean the channel coefficient for the (i+1)th resource in one resource set. $\tilde{c}_i$ and $v_{n_i}$ may each mean the coefficient for the (i+1)th DFT vector and the (i+1)th DFT vector for M DFT vectors selected among N*O DFT vectors.

The method using the oversampled DFT matrix described above is an example for reporting correlation information in the time domain, and is not intended to limit other methods applicable to the present disclosure. Accordingly, other base matrices/vectors may be used to report correlation information in the time domain, etc.

A (further) enhanced Type II codebook may be composed of a spatial domain (SD) basic vector combination and a frequency domain (FD) basic vector combination based on an oversampled DFT matrix.

Figure 9:
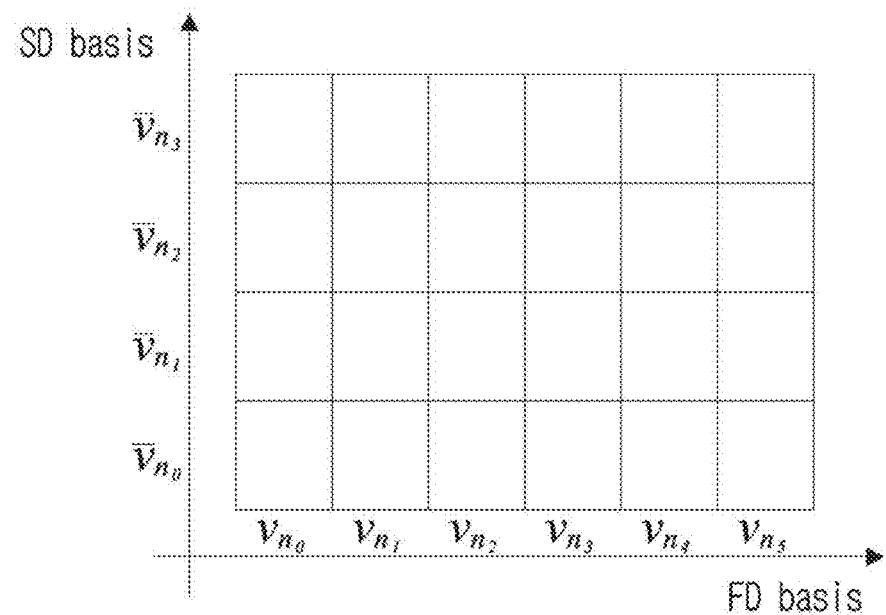
FIG. 9 illustrates a codebook composed of a combination of a spatial domain (SD) basis vector and a frequency domain (FD) basis vector to which the present disclosure may be applied.

FIG. 9 shows examples of SD basic vectors and FD basis vectors constituting an enhanced Type II codebook. That is, FIG. 9 shows an example of a codebook composed of a combination of 4 SD basis vectors and 6 FD basis vectors for a specific layer.

By parameters related to the enhanced type II codebook configured for the UE, the combination of SD basis vectors may be reported layer-commonly, and the combination of FD basis vectors may be reported layer-specific.

Accordingly, FIG. 9 shows an example of the SD/FD basis vector combination selected for a specific layer. For example, the four SD basis vectors in FIG. 9 may mean any DFT vector (e.g., $\bar{v}_{n_i} \in \{\bar{v}_0, \bar{v}_1, \ldots, \bar{v}_{O_1 N_1 O_2 N_2 - 1}\}$) in an oversampled DFT matrix of size $O_1 N_1 O_2 N_2$. Also, the six FD basis vectors in FIG. 9 may mean any DFT vector (e.g., $v_{n_f} \in \{v_0, v_1, \ldots, v_{N_3-1}\}$) in the oversampled DFT matrix of size N3.

DFT vectors based on the combination of basis vectors described above may be implemented as Equation 21 (co-polarization case) and Equation 22 (X-polarization case).

$$w = \frac{1}{\sqrt{\eta}} \sum_{i=0}^{3} \sum_{f=0}^{5} c_{i,f} \cdot \bar{v}_{n_i} \cdot v_{n_{f,\zeta}} \qquad \text{[Equation 21]}$$

$$= \frac{1}{\sqrt{\eta}} \begin{bmatrix} \sum_{i=0}^{3} \sum_{f=0}^{5} c_{i,f,0} \cdot \bar{v}_{n_i} \cdot v_{n_{f,\zeta}} \\ \sum_{i=0}^{3} \sum_{f=0}^{5} c_{i,f,1} \cdot \bar{v}_{n_i} \cdot v_{n_{f,\zeta}} \end{bmatrix} \qquad \text{[Equation 22]}$$

In Equation 21/22, $C_{i,f}$ may mean a coefficient (e.g., amplitude/phase) corresponding to the (i+1)th SD basis vector and the (f+1)th FD basis vector. Here, 0 may correspond to the first polarization in the X-polarization case, and 1 may correspond to the second polarization.

In Equations 21/22 (if assuming an FD basis vector based on an oversampled DFT matrix), $v_{n_f,\zeta}$ may mean $$e^{j\frac{2\pi\zeta n_f}{N_3}}.$$

Here, $\zeta \in \{0, 1, \ldots, N_3-1\}$ may be defined.

As mentioned above, as a method for reporting correlation information in the time domain, the UE may report the TD basis vector (or Doppler domain basis vector) based on the DFT matrix in addition to the SD basis vector combination and the FD basis vector combination.

FIG. 10 illustrates the combination of SD/FD basis vectors obtained at eight different time points. For example, FIG. 10 is an example of obtaining a codebook composed of a combination of the SD/FD basis vectors of FIG. 9 at a plurality of different viewpoints. FIG. 10 may be implemented using equations 23 (co-polarization case) and 24 (X-polarization case).

$$w = \frac{1}{\sqrt{\eta}} \sum_{i=0}^{3} \sum_{f=0}^{5} \sum_{t=0}^{3} c_{i,f,t} \cdot \bar{v}_{n_i} \cdot v_{n_{f,\zeta}} \cdot \tilde{v}_{i,f,t,\tau} \qquad \text{[Equation 23]}$$

$$w = \frac{1}{\sqrt{\eta}} \begin{bmatrix} \sum_{i=0}^{3} \sum_{f=0}^{5} \sum_{t=0}^{3} c_{i,f,t,0} \cdot \bar{v}_{n_i} \cdot v_{n_{f,\zeta}} \cdot \tilde{v}_{i,f,t,\tau} \\ \sum_{i=0}^{3} \sum_{f=0}^{5} \sum_{t=0}^{3} c_{i,f,t,1} \cdot \bar{v}_{n_i} \cdot v_{n_{f,\zeta}} \cdot \tilde{v}_{i,f,t,\tau} \end{bmatrix} \qquad \text{[Equation 24]}$$

In Equations 23 and 24, $v_{i,f,t,\tau}$ may mean the (t+1)th element of the (t+1)th TD basis vector among the TD basis vectors corresponding to the (i+1)th SD basis vector and the (τ+1)th FD basis vector.

In Equations 23 and 24, $\tilde{v}_{i,f,t,\tau}$ may mean $$e^{j\frac{2\pi\tau n_f}{O_3 N_4}},$$

and τ or $n_f \in \{0, 1, \ldots, O_3 N_4-1\}$ may be defined (assuming a TD basis vector based on an oversampled DFT matrix).

$c_{i,f,t}$ may mean a coefficient (e.g., amplitude/phase) corresponding to the (i+1)th SD basis vector, (f+1)th FD basis vector, and (t+1)th TD basis vector.

In FIG. 10 and Equation 22/23, it is assumed that a total of 8 different measurement values in the time domain are compressed based on 4 TD basis vectors.

The TD basis vector may refer to any DFT vector (e.g., $\tilde{v}_{i,f,t} \in \{\tilde{v}_0, \tilde{v}_1, \ldots, \tilde{v}_{O_3 N_4-1}\}$) in the oversampled DFT matrix of size $O_3 N_4$. Here, $O_3$ and $N_4$ may each mean an oversampling coefficient and the number of measurement values in the time domain.

Here, the vector size may be determined as $2a*3^b*5^c$ (here, a, b, c and non-negative integers) considering the implementation of the terminal (DFT size). Equations considering the above SD/FD/TD basis vectors can be implemented as Equations 25 (co-polarization case) and 26 (X-polarization case).

$$w = \frac{1}{\sqrt{\eta}} \sum_{i=0}^{N_{SD}-1} \sum_{f=0}^{N_{FD}-1} \sum_{t=0}^{N_{TD}-1} c_{i,f,t} \cdot \bar{v}_{n_i} \cdot v_{n_{f,\zeta}} \cdot \tilde{v}_{i,f,t,\tau} \qquad \text{[Equation 25]}$$

$$w = \frac{1}{\sqrt{\eta}} \begin{bmatrix} \sum_{i=0}^{N_{SD}-1} \sum_{f=0}^{N_{FD}-1} \sum_{t=0}^{N_{TD}-1} c_{i,f,t} \cdot \bar{v}_{n_i} \cdot v_{n_{f,\zeta}} \cdot \tilde{v}_{i,f,t,\tau} \\ \sum_{i=0}^{N_{SD}-1} \sum_{f=0}^{N_{FD}-1} \sum_{t=0}^{N_{TD}-1} c_{i,f,t} \cdot \bar{v}_{n_i} \cdot v_{n_{f,\zeta}} \cdot \tilde{v}_{i,f,t,\tau} \end{bmatrix} \qquad \text{[Equation 26]}$$

In Equation 25 and Equation 26, NSD, NED, and NTD may each mean the number of SD basis vectors, the number of FD basis vectors, and the number of TD basis vectors.

In order to most accurately report the TD basis vector in Equation 25 and Equation 26, the UE may report the optimal TD basis vector for each specific SD basis vector and FD basis vector combination.

As described above, when reporting the optimal TD basis vector for each specific SD basis vector and FD basis vector combination, as many reporting bits as $$N_{SD} \cdot N_{FD} \cdot \text{ceil}\left(\log_2\left(C_{N_{TD}}^{O_3 N_4}\right)\right)$$

may be required, and CSI overhead may increase significantly. Here, $$C_Y^X$$

may mean the number of cases in which Y is selected among X.

Hereinafter, a method for preventing an increase in CSI overhead when calculating and reporting CSI according to the method described above is described.

Embodiment 1

Embodiment related to a method for reporting the combination of TD basis vectors for each FD basis vector and a method of reporting a specific combination of TD basis vector combinations for each FD basis vector based on the bitmap for each SD basis vector for each FD/SD basis vector combination.

FIG. 11 illustrates a method of reporting different TD basis vector combinations for each SD basis vector based on the TD basis vector combination and bitmap after selecting a TD basis vector combination for the first FD basis vector.

For example, for the first FD basis vector, a combination of NTD TD basis vectors among $O_3 N_4$ may be selected. Additionally, a specific vector combination among the NTD TD basis vectors may be selected through different bitmaps defined for each SD basis vector.

Although FIG. 11 shows only an example of the first FD basis vector, the same operation may be performed for the entire FD basis vector. Here, the number of bits required to select a combination of TD basis vectors for each FD/SD basis vector may be reduced to $$N_{FD} \cdot \left( \text{ceil}\left( \log_2\left( C_{N_{TD}}^{O_3 N_4} \right) \right) \right) + N_{SD} \cdot N_{TD}.$$

For example, the number of bits to report for each FD/SD/TD basis vector is $$N_{SD} \cdot N_{FD} \cdot \text{ceil}\left( \log_2\left( C_{N_{TD}}^{O_3 N_4} \right) \right).$$

For example, when defined as '$N_{SD}$:14, $N_{FD}$:6, $N_{TD}$:4, $O_3$:4, $N_4$:8', the number of bits to report for each FD/SD/TD basis vector may be 384 bits.

The number of bits required to apply the method according to Embodiment 1 is $$N_{FD} \cdot \left( \text{ceil}\left( \log_2\left( C_{N_{TD}}^{O_3 N_4} \right) \right) + N_{SD} \cdot N_{TD} \right) \text{ bits.}$$

When applying the above-described example, the number of bits required to apply the method according to Embodiment 1 may be 192 bits.

In the above description, it is assumed that the number of TD basis vectors selected for each FD basis vector is the same, but this is not limited. The number of TD basis vectors selected for each FD basis vector can be defined differently. If the number of TD basis vectors selected for each FD basis vector is defined differently, the bits required for reporting may be defined as in Equation 27.

$$\sum_{i=0}^{N_{FD}-1} \text{ceil}\left( \log_2\left( C_{N_{TD,i}}^{O_3 N_4} \right) \right) + N_{SD} \cdot N_{TD,i} \qquad \text{[Equation 27]}$$

In Equation 27, $N_{TD,i}$ may mean the number of TD basis vectors selected for the (i+1)th FD basis vector.

In addition, in the above description, it is assumed that $N_{TD}$ basis vectors are selected for each FD basis vector, and each TD basis vector is determined based on a bitmap of the NTD size corresponding to the NTD basis vectors selected for each SD basis vector.

Additionally or alternatively, instead of/in addition to the method of determining a specific TD basis vector based on a bitmap of the $N_{TD}$ size for each SD basis vector, a method of selecting $N_{TD}$ among NTD TD basis vectors for each SD basis vector may be applied. Accordingly, the feedback overhead required for reporting may be defined as Equation 28.

$$\sum_{i=0}^{N_{FD}-1} \text{ceil}\left( \log_2\left( C_{N_{TD,i}}^{O_3 N_4} \right) \right) + N_{SD} \cdot \text{ceil}\left( \log_2\left( C_{N'_{TD,i}}^{N_{TD,i}} \right) \right) \qquad \text{[Equation 28]}$$

Embodiment 2

Embodiment 2 relates to a method for reporting TD basis vector combinations for each SD basis vector and a method of reporting a specific combination of TD basis vector combinations for each SD basis vector based on the bitmap for each FD basis vector for each FD/SD basis vector combination.

FIG. 12 shows an example where Embodiment 2 is applied. Specifically, FIG. 12 illustrates a method of reporting different TD basis vector combinations for each FD basis vector based on the TD basis vector combination and bitmap after selecting the TD basis vector combination for the first SD basis vector.

For example, for the first SD basis vector, a combination of $N_{TD}$ TD basis vectors among $O_3 N_4$ may be selected. Also, a specific vector combination among the NTD TD basis vectors may be selected through different bitmaps defined for each FD basis vector.

Although FIG. 12 shows only an example for the first SD basis vector, the same operation can be performed for all SD basis vectors. Here, the number of bits required to select the TD basis vector combination for each FD/SD basis vector can be reduced to $$N_{SD} \cdot \text{ceil}\left( \log_2\left( C_{N_{TD}}^{O_3 N_4} \right) \right) + N_{FD} \cdot N_{TD}.$$

For example, the number of bits to report for each FD/SD/TD basis vector is $$N_{SD} \cdot N_{FD} \cdot \text{ceil}\left( \log_2\left( C_{N_{TD}}^{O_3 N_4} \right) \right).$$

For example, when defined as '$N_{SD}$:14, $N_{FD}$:6, $N_{TD}$:4, $O_3$:4, $N_4$:8', the number of bits to report for each FD/SD/TD basis vector may be 384 bits.

The number of bits required to apply the method according to Embodiment 2 is $$N_{SD} \cdot \left( \text{ceil}\left( \log_2\left( C_{N_{TD}}^{O_3 N_4} \right) \right) + N_{FD} \cdot N_{TD} \right).$$

When applying the above-described example, the number of bits required to apply the method according to Embodiment 2 may be 160 bits.

In the above example, a method of selecting NTD TD basis vectors for each SD basis vector and determining each TD basis vector based on a bitmap of the NTD size corresponding to the NTD TD basis vectors selected for each FD basis vector was assumed.

Additionally or alternatively, instead of/in addition to the method of determining a specific TD basis vector based on a bitmap of the NTD size for each FD basis vector, a method of selecting N'TD out of NTD TD basis vectors for each FD basis vector may be applied. The feedback overhead required for this may be equal to Equation 29.

$$\sum_{i=0}^{N_{SD}-1} \text{ceil}\left( \log_2\left( C_{N_{TD,i}}^{O_3 N_4} \right) \right) + N_{FD} \cdot \text{ceil}\left( \log_2\left( C_{N'_{TD,i}}^{N_{TD,i}} \right) \right) \qquad \text{[Equation 29]}$$

In Embodiment 1 and/or Embodiment 2, a method for reducing CSI overhead when different TD basis vector combinations are reported for each FD/SD basis vector combination is described. For convenience of description of the present disclosure, the above-described method is referred to as FD/SD basis vector specific TD basis vector combination.

If the TD basis vector combination is determined to be dominant to the FD basis vector, regardless of the SD basis vector, different combinations of TD basis vectors may be reported for each basis vector. For convenience of description of the present disclosure, the above-described method is referred to as FD basis vector specific TD basis vector combination.

Conversely, if the TD basis vector combination is determined to be dominant to the SD basis vector, regardless of the FD basis vector, different TD basis vector combinations may be reported for each SD basis vector. For convenience of description of the present disclosure, the above-described method is referred to as SD basis vector specific TD basis vector combination.

Hereinafter, a method for further reducing CSI overhead will be described in the case of an FD base vector-specific TD basis vector combination or an SD base vector-specific TD base vector combination.

Embodiment 3

Example 3 relates to a method of reporting a single TD basis vector combination for all SD basis vectors, and a method of reporting a specific combination of single TD basis vector combinations for each FD basis vector based on a bitmap for each FD basis vector.

FIG. 13 shows an example where Embodiment 3 is applied. Specifically, FIG. 13 illustrates a method of selecting a single TD basis vector combination for all SD basis vectors and then reporting different TD basis vector combinations for each FD basis vector based on the TD basis vector combination and bitmap.

For example, a combination of NTD TD basis vectors among $O_3N4$ may be selected for all SD basis vectors. Additionally, a specific vector combination among the NTD TD basis vectors may be selected through different bitmaps defined for each FD basis vector.

Here, the number of bits required to select the TD basis vector combination for each FD basis vector may be reduced to $$\mathrm{ceil}\left(\log_2\left(C_{N_{TD}}^{O_3N_4}\right)\right) + N_{FD} \cdot N_{TD}.$$

As an example, the number of bits to report for each FD/SD/TD basis vector is $$N_{FD} \cdot \mathrm{ceil}\left(\log_2\left(C_{N_{TD}}^{O_3N_4}\right)\right).$$

For example, when defined as 'NSD:4, $N_{FD}$:6, $N_{TD}$:4, $O_3$:4, $N_4$:8', the number of bits to report for each FD/SD/TD basis vector may be 96 bits.

The number of bits required to apply the method according to Embodiment 3 is $$\mathrm{ceil}\left(\log_2\left(C_{N_{TD}}^{O_3N_4}\right)\right) + N_{FD} \cdot N_{TD} \ \text{bits.}$$

When applying the above-described example, the number of bits required to apply the method according to Embodiment 3 may be 40 bits.

The above-described method may be interpreted as an operation of first selecting a common TD basis vector for all FD basis vectors (e.g., the union of the TD basis vectors corresponding to each FD basis vector) and then selecting a specific TD basis vector combination among the selected TD basis vectors for each FD basis vector.

In the above-described method, a method of selecting NTD TD basis vectors for all SD basis vectors and determining each TD basis vector for each FD basis vector was assumed based on a bitmap of the NTD size corresponding to the selected NTD TD basis vectors is assumed.

Additionally or alternatively, as an alternative to/in addition to the method of determining a specific TD basis vector based on a bitmap of the NTD size for each FD basis vector, a method of selecting $N'_{TD}$ out of NTD TD basis vectors for each FD basis vector may be applied. The feedback overhead required for this can be defined as Equation 30.

$$\mathrm{ceil}\left(\log_2\left(C_{N_{TD}}^{O_3N_4}\right)\right) + N_{FD} \cdot \mathrm{ceil}\left(\log_2\left(C_{N'_{TD}}^{N_{TD}}\right)\right) \qquad \text{[Equation 30]}$$

Embodiment 4

Embodiment 4 relates to a method for reporting a single TD basis vector combination for all FD basis vectors and a method of reporting a specific combination of single TD basis vector combinations for each SD basis vector based on the bitmap for each SD basis vector.

FIG. 14 shows an example where Embodiment 4 is applied. Specifically, FIG. 14 illustrates a method of selecting a single TD basis vector combination for all FD basis vectors and then reporting different TD basis vector combinations for each SD basis vector based on the TD basis vector combination and bitmap.

For example, a combination of NTD TD basis vectors among $O_3N_4$ may be selected for all FD basis vectors. Additionally, a specific vector combination among the NTD TD basis vectors may be selected through different bitmaps defined for each SD basis vector. Here, the number of bits required to select a TD basis vector combination for each SD basis vector may be reduced to:

$$\mathrm{ceil}\left(\log_2\left(C_{N_{TD}}^{O_3N_4}\right)\right) + N_{SD} \cdot N_{TD}.$$

For example, the number of bits to report for each FD/SD/TD basis vector is $$N_{SD} \cdot \mathrm{ceil}\left(\log_2\left(C_{N_{TD}}^{O_3N_4}\right)\right).$$

For example, when defined as '$N_{SD}$:4, $N_{FD}$:6, $N_{TD}$:4, $O_3$:4, $N_4$:8', the number of bits to report for each FD/SD/TD basis vector may be 64 bits.

The number of bits required to apply the method according to Embodiment 4 is $$\mathrm{ceil}\left(\log_2\left(C_{N_{TD}}^{O_3N_4}\right)\right) + N_{SD} \cdot N_{TD} \ \text{bits.}$$

When applying the above-described example, the number of bits required to apply the method according to Embodiment 4 may be 32 bits.

The above-described method may be interpreted as an operation of first selecting a common TD basis vector for all SD basis vectors (e.g., union of TD basis vectors corresponding to each SD basis vector) and then selecting a specific TD basis vector combination among the selected TD basis vectors for each SD basis vector.

In the method described above, a method of selecting NTD TD basis vectors for all FD basis vectors and determining each TD basis vector based on the NTD-sized bitmap corresponding to the NTD TD basis vectors selected for each SD basis vector was assumed.

Additionally or alternatively, instead of/in addition to the method of determining a specific TD basis vector based on a bitmap of the NTD size for each SD basis vector, a method of selecting $N'_{TD}$ out of $N_{TD}$ TD basis vectors for each SD basis vector may be applied. The feedback overhead required for this can be defined as Equation 31.

$$\text{ceil}\left(\log_2\left(C_{N_{TD}}^{O_3 N_4}\right)\right) + N_{SD} \cdot \text{ceil}\left(\log_2\left(C_{N'_{TD}}^{N_{TD}}\right)\right) \qquad \text{[Equation 31]}$$

The above-described Embodiment 1, Embodiment 2, Embodiment 3, and/or Embodiment 4 may be applied independently or together. Additionally or alternatively, a specific method according to Embodiment 1, Embodiment 2, Embodiment 3, and/or Embodiment 4 is fixedly defined, or a specific method may be configured/instructed to the UE based on L1 signaling (e.g., DCI), L2 signaling (e.g., MAC-CE), or/and higher layer signaling (e.g., RRC, SIB).

Additionally or alternatively, the configurations/indications may be determined based on the UE's reported values. Additionally or alternatively, the method may be changed depending on the RS cycle and the variability of the time/frequency/space domain of the channel.

Additionally or alternatively, after applying a specific method, the UE may report the specific method. As an example, assume that a UE reports a specific method used. Here, the payload (of CSI) may change depending on which method the UE uses/applies. Therefore, information on the method used/applied by the UE (e.g., indication bit(s)) may be included in Part I CSI when performing 2-part encoding.

Embodiment 1, Embodiment 2, Embodiment 3, and/or Embodiment 4 may be defined to have layer-common/specific properties. Additionally or alternatively, a specific method may be fixedly defined, or a specific method may be set/instructed to the terminal based on L1/L2 signaling. Additionally or alternatively, the settings/instructions may be determined based on the UE's reported values.

Regarding Embodiment 1, Embodiment 2, Embodiment 3, and/or Embodiment 4 above, the UE may select and report only TD basis vector corresponding to SD-FD basis vector pair(s)/SD basis vector(s)/FD basis vector(s) for the value X indicated by the base station or the value X selected by the UE.

In the above-described example, when the UE makes a selection, the base station may configure/indicate the maximum value for the value that the UE may select, or the maximum value may be defined as a fixed rule. The UE's report value may be transmitted as part 1 CSI.

FIG. 15 is a diagram for describing the signaling procedure of the network side and the UE according to an embodiment of the present disclosure.

FIG. 15 shows an example of signaling between a network side and a terminal (UE) in an M-TRP situation to which the Embodiments (e.g., Embodiment 1, Embodiment 2, Embodiment 3, Embodiment 4 or a combination of one or more of the detailed Embodiments) of the present disclosure described above may be applied.

Here, the UE/network side is an example and may be replaced with various devices as described with reference to FIG. 16. FIG. 15 is for convenience of explanation and does not limit the scope of the present disclosure. Additionally, some step(s) shown in FIG. 15 may be omitted depending on the situation and/or settings. Additionally, in the operation of the network side/UE in FIG. 15, the above-described uplink transmission and reception operation, M-TRP-related operation, etc. may be referenced or used.

In the following description, the network side may be one base station including a plurality of TRPs, or may be one cell including a plurality of TRPs. Alternatively, the network side may include a plurality of remote radio heads (RRHs)/remote radio units (RRUs). For example, an ideal/non-ideal backhaul may be established between TRP 1 and TRP 2 constituting the network side. In addition, although the following description is based on a plurality of TRPs, this may be equally extended and applied to transmission through a plurality of panels/cells, and may also be extended and applied to transmission through a plurality of RRHs/RRUS.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., a CORESET index, an ID).

In an example, when one UE is configured to perform transmission and reception with a plurality of TRPs (or cells), it may mean that a plurality of CORESET groups (or CORESET pools) are configured for one terminal. A configuration on such a CORESET group (or a CORESET pool) may be performed through higher layer signaling (e.g., RRC signaling, etc.).

In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station.

The UE may receive configuration information from the base station (M105). That is, the base station may transmit configuration information to the UE.

For example, the configuration information may include information related to network-side configuration (i.e., TRP configuration), resource allocation information related to M-TRP-based transmission and reception, etc. The configuration information may be transmitted through a higher layer (e.g., RRC, MAC CE). The configuration information may include information related to uplink transmission based on a configured grant (CG).

As another example, the configuration information may include system information, scheduling information, CSI-related configuration information (e.g., configuration information related to CSI reporting settings, configuration information related to CSI-RS resource settings, etc.). Additionally, if the configuration information is defined or configured in advance, the corresponding step may be omitted.

As another example, as described in the above-described embodiment (e.g., Embodiment 1, Embodiment 2, Embodiment 3, Embodiment 4 or a combination of one or more of the detailed Embodiments thereof), the configuration information may include 'NZP-CSI-RS-Resouceset IE'/'NZP- CSI-RS-ResourceID'/CSI measurement setting information/ CSI reporting configuration information (e.g., 'CSI-ReportConfig')/CSI resource configuration information (e.g., 'CSI-ResourceConfig'), etc.

As another example, the configuration information may include PDCCH-related configuration information and/or PDSCH-related configuration information.

As another example, the configuration information may include information about the number (e.g., K) of CSI that the UE should actually report among all candidates that can be reported as CSI. For example, based on the configuration information, the maximum number of coefficients that the UE report may be must configured/indicated for each layer or across layers.

For example, based on the configuration information, information related to reciprocity between DL/UL channels (e.g., whether DL/UL reciprocity, degree of similarity between DL/UL channels, etc.) may be configured for the UE.

For example, the operation of the UE (100 or 200 in FIG. 16) in the above-described M110 step receiving the configuration information from the network side (200 or 100 in FIG. 16) may be implemented by the device in FIG. 16, which will be described below. For example, referring to FIG. 16, one or more processors 102 may control one or more transceivers 106 and/or one or more memories 104, etc. to receive the configuration information, and one or more transceivers 106 may receive the configuration information from the network side.

The UE may receive control information from the base station (M110). That is, the base station may transmit control information to the UE. For example, the control information may include DCI, and the DCI may be transmitted from the base station to the terminal through PDCCH.

For example, the control information may include indication information for CSI reporting. For example, the control information may include information for triggering aperiodic CSI reporting. For example, if semi-persistent CSI reporting/periodic CSI reporting is performed/configured, step M110 may be omitted.

For example, the control information may include information about the number (e.g., K) of candidates that the UE should actually report among all candidates that can be reported as CSI. For example, based on the control information, the maximum number of coefficients that the UE must report may be configured/indicated for each layer or across layers.

For example, the operation of the UE (100 or 200 in FIG. 16) in the above-described M110 step receiving control information from the network side (200 or 100 in FIG. 16) can be implemented by the device in FIG. 16, which will be described below. For example, referring to FIG. 16, one or more processors 102 may control one or more transceivers 106 and/or one or more memories 104, etc. to receive control information, and one or more transceivers 106 may receive control information from the network side.

The UE may receive RS (e.g., SSB/CSI-RS/TRS/PT-RS) for channel state measurement from the base station (M115). That is, the base station may transmit RS to the UE.

For example, the RS may be transmitted periodically/non-periodically/semi-periodically from the base station to the UE. For example, as described in the above-described embodiment (e.g., Embodiment 1, Embodiment 2, Embodiment 3, Embodiment 4 or a combination of one or more of the detailed Embodiments thereof, etc.), a (beamformed)

CSI-RS port to which precoding in the SD (spatial domain) and precoding in the FD (frequency domain) is applied can be transmitted to the UE.

For example, the operation of the UE (100 or 200 in FIG. 16) in the above-described M115 step receiving the RS from the network side (200 or 100 in FIG. 16) can be implemented by the device in FIG. 16, which will be described below. For example, referring to FIG. 16, one or more processors 102 may control one or more transceivers 106 and/or one or more memories 104 to receive the RS, and one or more transceivers 106 may receive the RS from a network side.

The UE may perform CSI measurement based on the RS and information received from the base station (e.g., information on reporting configurations, information indicated by DCI, etc.) (M120).

For example, when the UE performs CSI measurement, it may be based on the above-described embodiment (e.g., Embodiment 1, Embodiment 2, Embodiment 3, Embodiment 4 or a combination of one or more of the detailed Embodiments thereof, etc.). For example, CSI measurement may be performed based on a codebook (e.g., Type I, Type II, improved Type II, port selection codebook, further enhanced Type II port selection codebook, etc.).

For example, the operation in which the above-described M120 step terminal (100/200 in FIG. 16) performs CSI measurement can be implemented by the device in FIG. 16, which will be described below. For example, referring to FIG. 16, one or more processors 102 may control one or more transceivers 106 and/or one or more memories 104, etc. to perform the CSI measurement.

The UE may report CSI to the base station (M125). That is, the base station may receive CSI from the UE.

For example, the CSI reporting operation may be performed using the CSI reporting method described above. For example, the CSI report may be transmitted from the UE to the base station through an uplink channel (e.g., PUCCH/PUSCH). For example, the CSI may include PMI/CQI/RI, etc.

For example, as described in the above-described embodiment (e.g., Embodiment 1, Embodiment 2, Embodiment 3, Embodiment 4, or a combination of one or more of the detailed examples thereof, etc.), codebook-based CSI reporting may be performed.

For example, based on the CSI, the base station may transmit data scheduling information and/or data/RS (for data decoding) based on the scheduling information to the UE.

Data scheduling and precoding to be applied to data may be determined/calculated by the base station based on the CSI reported by the UE, etc. However, this is only an example, and the base station may not determine/calculate data scheduling and precoding to be applied to the data by considering only the CSI reported by the UE.

For example, the operation of the UE in the above-described M125 step (100/200 in FIG. 16) reporting CSI to the base station may be implemented by the device of FIG. 16, which will be described below. For example, referring to FIG. 16, one or more processors 102 may control one or more transceivers 106 and/or one or more memories 104 to report the CSI, and one or more transceivers 106 may transmit the CSI.

For example, the operation of the above-described M125 step base station (100/200 in FIG. 16) receiving CSI from the UE can be implemented by the device of FIG. 16, which will be described below. For example, referring to FIG. 16, one or more processors 102 may control one or more transceivers 106 and/or one or more memories 104 to receive the CSI, and one or more transceivers 106 may receive the CSI.

General Device to which the Present Disclosure May be Applied

FIG. 16 is a diagram which illustrates a block diagram of a wireless communication system according to an embodiment of the present disclosure.

In reference to FIG. 16, a first device 100 and a second device 200 may transmit and receive a wireless signal through a variety of radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A comprising:

receiving, by a user equipment (UE) from a base station, configuration information related to at least one channel state information (CSI)-reference signal (RS) resource;

receiving, by the UE from the base station, a CSI-RS based on the at least one CSI-RS resource; and transmitting, by the UE to the base station, CSI utilizing at least one bitmap related to a location of a non-zero coefficient, based on the CSI-RS, wherein the at least one bitmap for a combination of at least one time domain basis vector includes information on the location of the non-zero coefficient in at least one frequency domain basis vector and at least one spatial domain basis vector.

2. The method of claim 1, wherein:

the combination of the at least one time domain basis vector corresponding to a specific frequency domain basis vector among the at least one frequency domain basis vector is selected, and based on the at least one bitmap corresponding to each of the at least one spatial domain basis vector, the CSI including a coefficient corresponding to both of the specific frequency domain basis vector and the combination of the at least one time domain basis vector is transmitted to the base station.

3. The method of claim 1, wherein:

the combination of the at least one time domain basis vector corresponding to a specific spatial domain basis vector among the at least one spatial domain basis vector is selected, and based on the at least one bitmap corresponding to each of the at least one frequency domain basis vector, the CSI including a coefficient corresponding both of the specific space domain basis vector and combination of the at least one time domain basis vector is transmitted to the base station.

4. The method of claim 1, wherein:

the combination of the at least one time domain basis vectors is selected for all of the at least one spatial domain basis vector, and based on the at least one bitmap corresponding to each of the at least one frequency domain basis vector, the CSI including a coefficient corresponding both of the at least one frequency domain basis vector and the combination of the at least one specific time domain basis vector is transmitted to the base station.

5. The method of claim 1, wherein:

the combination of the at least one time domain basis vectors is selected for all of the at least one frequency domain basis vector, and based on the at least one bitmap corresponding to each of the at least one spatial domain basis vector, the CSI including a coefficient corresponding both of the at least one spatial domain basis vector and the combination of the at least one time domain basis vector is transmitted to the base station.

6. The method of claim 1, wherein:

first information indicating to utilize the at least one bitmap corresponding to each of the at least one spatial domain basis vector or the at least one bitmap corresponding to each of the at least one frequency domain basis vector is received from the base station.

7. The method of claim 1, wherein:

second information is included in part 1 of the CSI and transmitted to the base station.

8. A user equipment (UE) comprising:

at least one transceiver; and at least one processor connected to the at least one transceiver, wherein the at least one processor is configured to:

receive, from a base station through the at least one transceiver, configuration information related to at least one channel state information (CSI)-reference signal (RS) resource;

receive, from the base station through the at least one transceiver, a CSI-RS based on the at least one CSI-RS resource; and transmit, to the base station through the at least one transceiver, CSI utilizing at least one bitmap related to a location of a non-zero coefficient based on the CSI-RS, wherein the at least one bitmap for a combination of at least one time domain basis vector includes information on the location of the non-zero coefficient in at least one frequency domain basis vector and at least one spatial domain basis vector.

9. A base station comprising:

at least one transceiver; and at least one processor connected to the at least one transceiver, wherein the at least one processor is configured to:

transmit, to a user equipment (UE) through the at least one transceiver, configuration information related to at least one channel state information (CSI)-reference signal (RS) resource;

transmit, to the UE through the at least one transceiver, a CSI-RS based on the at least one CSI-RS resource; and receive, from the UE through the at least one transceiver, CSI utilizing at least one bitmap related to a location of a non-zero coefficient based on the CSI-RS, wherein the at least one bitmap for a combination of at least one time domain basis vector includes information on the location of the non-zero coefficient in at least one frequency domain basis vector and at least one spatial domain basis vector.

* * * * *